US012804019B2

(12) United States Patent
Muthukrishnan et al.

(10) Patent No.: US 12,804,019 B2
(45) Date of Patent: Nov. 17, 2026

(54) SYSTEM AND METHOD FOR EXPONENTIAL AI TRAINING DATA GENERATION THROUGH RELATIONSHIP EVOLUTION VIA METADATA PATTERNS

(71) Applicant: ICA AI, Inc., Boca Raton, FL (US)

(72) Inventors: Akila Muthukrishnan, Bangalore (IN); Raymond J. Sheppard, Spring Hill, FL (US); Alan W. McCord, Forney, TX (US); Gustavo Manuel Damil Marin, Point Roberts, WA (US)

(73) Assignee: ICA AI, Inc., Boca Raton, FL (US)

( * ) Notice: Subject to any disclaimer, the term of this patent is extended or adjusted under 35 U.S.C. 154(b) by 0 days.

(21) Appl. No.: 19/546,455

(22) Filed: Feb. 23, 2026

(65) Prior Publication Data

US 2026/0246821 A1 Aug. 20, 2026

Related U.S. Application Data

(63) Continuation-in-part of application No. 19/350,012, filed on Oct. 5, 2025, now Pat. No. 12,621,354, which (Continued)

(51) Int. Cl.

| | |
|---|---|
| ***H04L 65/1076*** | (2022.01) |
| ***H04L 51/02*** | (2022.01) |
| ***H04L 65/1096*** | (2022.01) |

(52) U.S. Cl.
CPC .......... *H04L 65/1076* (2013.01); *H04L 51/02* (2013.01); *H04L 65/1096* (2013.01)

(58) Field of Classification Search
None
See application file for complete search history.

(56) References Cited

U.S. PATENT DOCUMENTS

| | | | | |
|---|---|---|---|---|
| 11,392,356 | B1 * | 7/2022 | Leopoldseder ......... | G06F 8/443 |
| 12,283,328 | B2 * | 4/2025 | Sharon .................. | G11C 16/26 |

(Continued)

*Primary Examiner* — Raqiul A Choudhury
(74) *Attorney, Agent, or Firm* — Marin Patents LLC; Gustavo Marin

(57) ABSTRACT

A system for exponential artificial intelligence training data generation includes a communication management server that receives entity interaction data from entities across multiple domains. The server extracts metadata patterns and validates them using pattern confidence scores based on data completeness, temporal consistency, and behavioral coherence. Multi-dimensional relationship vectors comprising temporal, behavioral, communication frequency, and channel preference dimensions are converted to relationship strength scores. Qualified entity pairs generate N(N−1)/2 training combinations processed with fidelity characteristics to create emotionally resonant, temporally layered, symbolically rich, and contextually adaptive training data. As relationships mature, a Quality Multiplication Factor (QMF) progressively increases training data value. The system measures organic growth rate from relationship evolution (vector changes over time) and automatically adjusts system parameters when growth declines, triggering adaptive optimization of temporal windows, dimensional emphasis, and fidelity sensitivity. A self-improving system is created that generates exponentially increasing training data value without requiring new entity acquisition.

18 Claims, 17 Drawing Sheets

Related U.S. Application Data is a continuation-in-part of application No. 19/298,256, filed on Aug. 13, 2025, now Pat. No. 12,621,353, which is a continuation-in-part of application No. 19/224,748, filed on May 31, 2025, now Pat. No. 12,457,255, which is a continuation-in-part of application No. 19/066,192, filed on Feb. 28, 2025, now Pat. No. 12,388,880, which is a continuation-in-part of application No. 18/921,443, filed on Oct. 21, 2024, now Pat. No. 12,261,893, which is a continuation of application No. 18/751,905, filed on Jun. 24, 2024, now Pat. No. 12,155,700.

(60) Provisional application No. 63/601,645, filed on Nov. 21, 2023.

(56) References Cited

U.S. PATENT DOCUMENTS

| | | | | |
|---|---|---|---|---|
| 2021/0073304 | A1* | 3/2021 | Kim | G06N 20/00 |
| 2022/0292353 | A1* | 9/2022 | Duckheim | G06N 3/08 |
| 2023/0351514 | A1* | 11/2023 | Eagan, III | G06N 20/00 |
| 2024/0092397 | A1* | 3/2024 | Carter | B60W 60/0027 |

* cited by examiner

SYSTEM AND METHOD FOR EXPONENTIAL AI TRAINING DATA GENERATION THROUGH RELATIONSHIP EVOLUTION VIA METADATA PATTERNS

CROSS-REFERENCE TO RELATED APPLICATIONS

This application is a continuation-in-part of U.S. application Ser. No. 19/350,012, filed Oct. 5, 2025, which is a continuation-in-part of U.S. application Ser. No. 19/298,256, filed Aug. 13, 2025, which is a continuation-in-part of U.S. application Ser. No. 19/224,748, filed May 31, 2025, which is a continuation-in-part of U.S. application Ser. No. 19/066,192, filed Feb. 28, 2025, which is a continuation-in-part of U.S. application Ser. No. 18/921,443, filed Oct. 21, 2024, which is a continuation of U.S. application Ser. No. 18/751,905, filed Jun. 24, 2024, which claims the benefit of U.S. Provisional Application No. 63/601,645, filed Nov. 21, 2023, the disclosures of which are hereby incorporated by reference in their entireties.

BACKGROUND OF THE INVENTION

Field of the Art

The disclosure relates to the field of artificial intelligence training systems, and more particularly to the field of generating training data using privacy preserving metadata pattern analysis from communication systems.

Discussion of the State of the Art

The artificial intelligence (AI) industry faces a fundamental crisis in training data generation that threatens the scalability and effectiveness of AI systems across all domains. This crisis manifests through interconnected constraints that have created systemic limitations in how AI systems learn and improve.

The foundation of this crisis lies in the linear relationship between data collection and training capacity that characterizes current AI systems. Current AI training systems process individual data points as discrete training examples, creating a linear relationship between entity count and training data volume. A system processing thousand entities generates exactly thousand training examples, while ten thousand entities generate ten thousand examples. As AI models grow in sophistication and complexity, their appetite for training data increases exponentially, while traditional collection methods continue to provide only linear growth. This mathematical mismatch creates a large gap between AI training data requirements and available supply, leading to training data scarcity crisis that constrains AI advancement across all sectors.

Compounding the scarcity problem, existing AI systems require content analysis to generate training data, necessitating access to sensitive information including private communications, personal documents, and confidential data. Current AI training systems analyze message content, email text, and communication substance to determine relationship patterns, creating insurmountable limitations for privacy-preserving applications where content access is legally prohibited or ethically unacceptable. Healthcare communications, financial interactions, and personal relationships remain inaccessible to AI training systems due to these privacy requirements.

Further, the privacy constraints get exacerbated by fundamental limitations in how AI systems utilize training data across different application domains. Current systems implement domain-specific training approaches where data collected for one application provides minimal benefit to other domains. Healthcare relationship patterns that could inform financial AI development remain isolated, while educational interaction patterns that could enhance e-commerce personalization go unutilized. This isolation multiplies training data requirements across industries and prevents cross-domain learning benefits.

Traditional systems rely on static training datasets that do not regenerate over time, requiring expensive new data collection when datasets become exhausted. When a training dataset becomes exhausted or outdated, the system requires acquisition of entirely new data through expensive collection processes. The training data does not naturally multiply or expand based on ongoing system operation, creating recurring costs and limiting the long-term sustainability of AI training approaches.

Therefore, there exists a need for AI training data generation systems that operate across multiple domains and generates exponential training data for existing AI systems.

SUMMARY OF THE INVENTION

Accordingly, the inventor has conceived and reduced to practice, in a preferred embodiment of the invention, a system and method for exponential artificial intelligence training data generation that transforms metadata-based relationship intelligence generated by a communication management server into AI training data while maintaining complete privacy protection through metadata-only processing.

According to a preferred embodiment, the system implements a communication management server comprising one or more processors, a memory, and programming instructions that receives entity interaction data from a plurality of entities across multiple communication channels, including healthcare, financial services, education, e-commerce, and social media domains. The system extracts and analyzes metadata patterns from this interaction data without accessing communication content, preserving privacy while enabling sophisticated pattern recognition across diverse organizational and sectoral contexts.

For each identified metadata pattern, the system calculates a pattern confidence score based on three critical factors: data completeness, temporal consistency, and behavioral coherence. This multi-factor evaluation ensures that only statistically significant and reliable patterns influence subsequent processing. Patterns exceeding a configurable quality threshold (typically 0.6-0.9 on a normalized scale) are validated and used to identify qualified entity pairs for relationship analysis.

The validated patterns are converted to multi-dimensional relationship vectors through a standardized process that harmonizes metadata across different communication contexts, filters and segments patterns by type and temporal characteristics, and vectorizes them into numerical representations suitable for machine learning processing. Each entity relationship is represented through multiple specialized dimensions that capture distinct aspects of relationship characteristics and dynamics.

The system calculates relationship strength scores by applying dimension-specific weights to each component of the multi-dimensional vectors, with different dimensions receiving appropriate emphasis based on relationship type, domain context, and behavioral characteristics. These scores quantify the quality and reliability of entity relationships, enabling rigorous quality-based filtering and selection of entity pairs for training data generation.

When relationship strength scores exceed a predetermined threshold, the system generates relationship combination data from these qualified entity pairs. This data is then transformed into N(N−1)/2 training combination data, implementing the mathematical foundation that enables exponential scaling of training data generation.

The training combination data is processed using epistemic fidelity characteristics to generate final training data that is emotionally resonant, temporally layered, symbolically rich, and contextually adaptive. Each training combination includes multi-dimensional relationship vectors, relationship strength scores, domain classification labels, and cross-domain compatibility indicators that enhance the richness and applicability of the training material.

The multi-dimensional vectors encompass four primary dimensional categories: (1) temporal dimensions capturing communication timing patterns, response latency patterns, and interaction duration characteristics; (2) behavioral dimensions capturing engagement patterns, initiation patterns, and reciprocity patterns; (3) communication frequency dimensions capturing interaction frequency and cadence patterns; and (4) channel preference dimensions capturing communication channel usage patterns and preferences across different communication modalities.

According to a preferred embodiment, the system continuously improves training data quality through relationship evolution over time. Rather than treating relationship vectors as static entities, the system dynamically updates multi-dimensional relationship vectors based on changing entity interaction data as new interactions occur. Each update incorporates fresh temporal, behavioral, frequency, and channel data from successive interactions, progressively enriching the relationship representation.

As relationships evolve and vectors are updated, the system computes a Quality Multiplication Factor (QMF) that quantifies the improvement in training data quality as a direct function of relationship age. The QMF is computed as a non-linear scaling function, meaning quality improvements accelerate at early relationship ages but stabilize as relationships mature. The QMF serves as an indication of accumulated temporal layering (depth of temporal patterns), behavioral evolution patterns (maturation of interaction behaviors), and contextual adaptivity characteristics (relationship's demonstrated flexibility across contexts).

Responsive to computing updated QMF, the system implements a combination regeneration process. The N(N−1)/2 training combinations are regenerated from the updated multi-dimensional relationship vectors, ensuring that each regeneration incorporates the latest relationship evolution data. The computed QMF is applied to each combination's quality score as a multiplicative factor, with older relationships receiving higher QMF multipliers than younger relationships. This application of QMF directly increases the training data value attribution for each combination, reflecting the superior epistemic fidelity of training data generated from mature relationships. The regenerated combinations are stored or exported with quality-enhanced metadata that explicitly indicates the applied QMF value, relationship age, and other quality indicators.

According to a preferred embodiment, the system implements a continuous measurement capability that quantifies training data generation performance through calculation of an Organic Growth Rate (OGR). The OGR measures the quantity of new, valuable training data being generated purely from the temporal evolution of existing relationships within a specified time period, without any requirement for external data acquisition. The OGR is compared against a configurable target threshold that can be adjusted based on deployment characteristics, business objectives, relationship age distribution, and domain-specific factors. When the measured OGR falls below the target threshold, the system automatically triggers adaptive stimulation mechanisms that optimize system performance.

These automatic adjustments may include: (1) adjusting temporal window granularity—the time windows over which temporal evolution is measured, enabling capture of patterns that manifest over different time scales; (2) adjusting dimension-specific weighting—shifting emphasis toward dimensions showing strongest evolution and de-emphasizing stagnant dimensions; and (3) adjusting fidelity enhancement sensitivity—increasing the granularity and sensitivity of temporal layering analysis to capture more subtle relationship development patterns.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
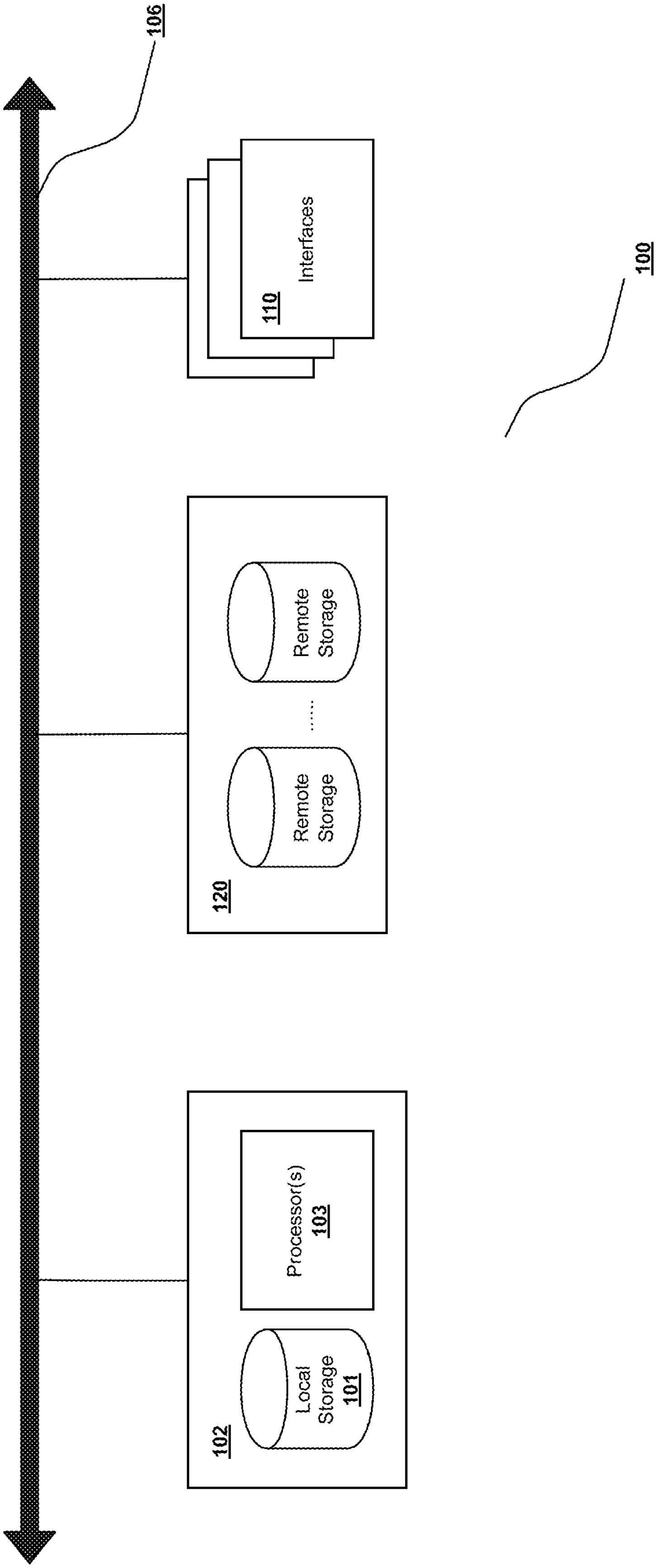
FIG. 1 is a block diagram illustrating an exemplary hardware architecture of a computing device used in an embodiment of the invention.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to fully illustrate one or more aspects of the inventions. Similarly, although process steps, method steps, algorithms or the like may be described in sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of the described processes may be performed in any practical order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions, and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

One or more different inventions may be described in the present application. Further, for one or more of the inventions described herein, numerous alternative embodiments may be described; it should be appreciated that these are presented for illustrative purposes only and are not limiting the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control the execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
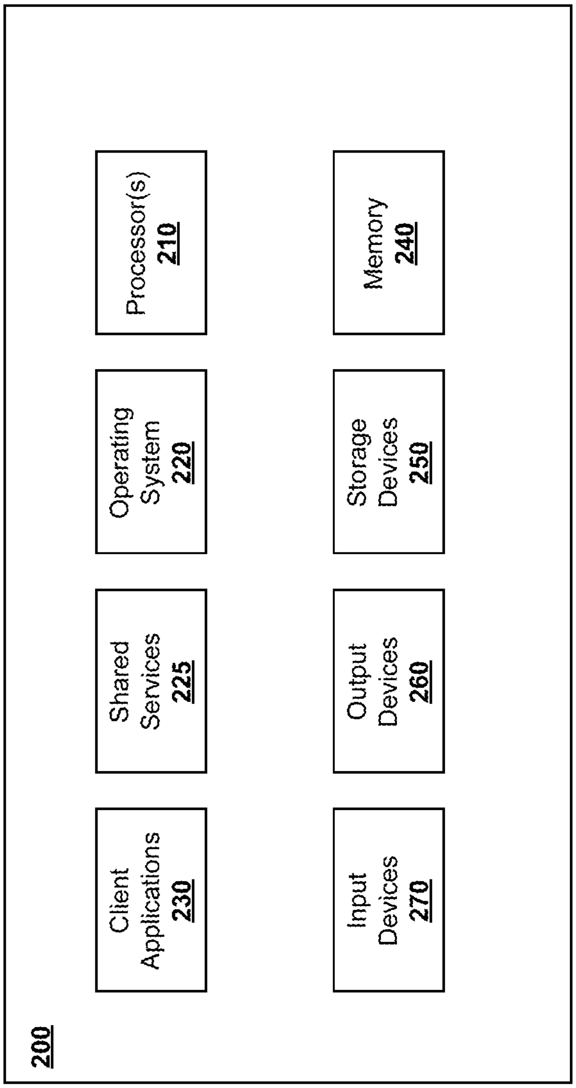
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example, to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
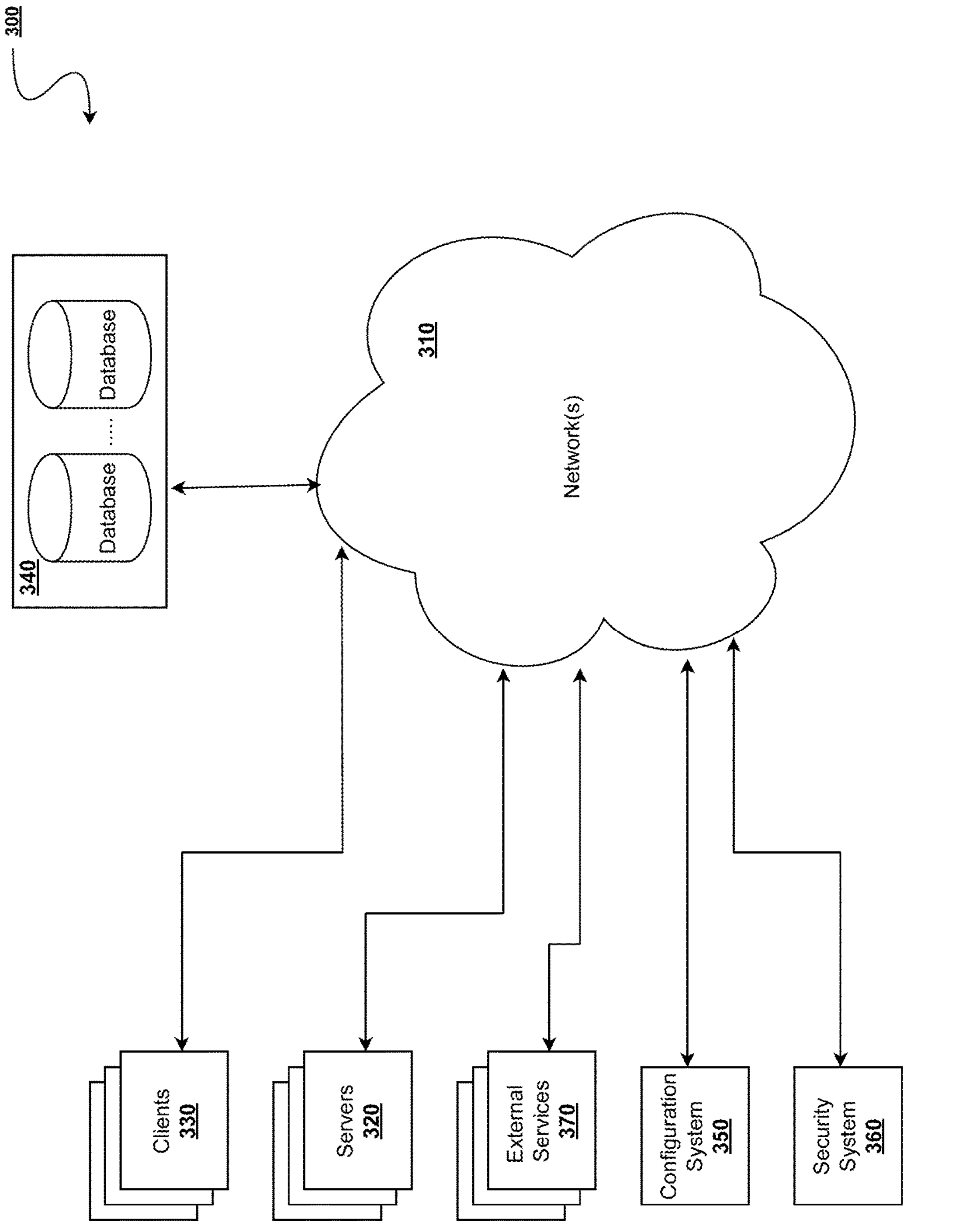
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular incoming communication. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments, one or more databases 340 may comprise a relational database system using a structured query language (SQL), while others may comprise an alternative data storage technology such as those referred to in the art as "NoSQL" (for example, Hadoop Cassandra, Google Big Table, Mongo, and so forth). In some embodiments, variant database architectures such as column-oriented databases, in-memory databases, clustered databases, distributed databases, or even flat file data repositories may be used according to the invention. In addition, Graph-oriented databases, also known as graph databases, are designed to manage and store data structured as graphs, where entities (nodes) are interconnected with relationships (edges), examples include (Amazon Neptune, Microsoft Azure Cosmos DBs, TigerGraph, GraphDB and so forth). These databases are particularly effective for applications involving complex relational queries and traversals, such as social networks, recommendation systems, and network topology analysis.

In addition, vector databases also referred to as vector search databases or similarity search databases, are engineered to index, manage, and retrieve high-dimensional vectors typically generated by machine learning models. These databases are adept at handling operations such as nearest neighbor search in vector space, which is critical for tasks involving image recognition, natural language processing, and recommendation engines, where items are represented as vectors in a multi-dimensional space. Notable examples include Pinecone, Milvus, Weaviate, and Elasticsearch with vector plugins. Vector databases excel in scenarios that require matching patterns or finding similar items based on vector proximity, making them indispensable for modern AI-driven applications such as semantic search, personalization features, and fraud detection systems.

It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each is generally associated with any IT or web systems. It should be understood by one having ordinary skill in the art that any configuration or security subsystems known in the art now or in the future may be used in conjunction with embodiments of the invention without limitation unless a specific security 360 or configuration system 350 or approach is specifically required by the description of any specific embodiment.

Figure 4A:
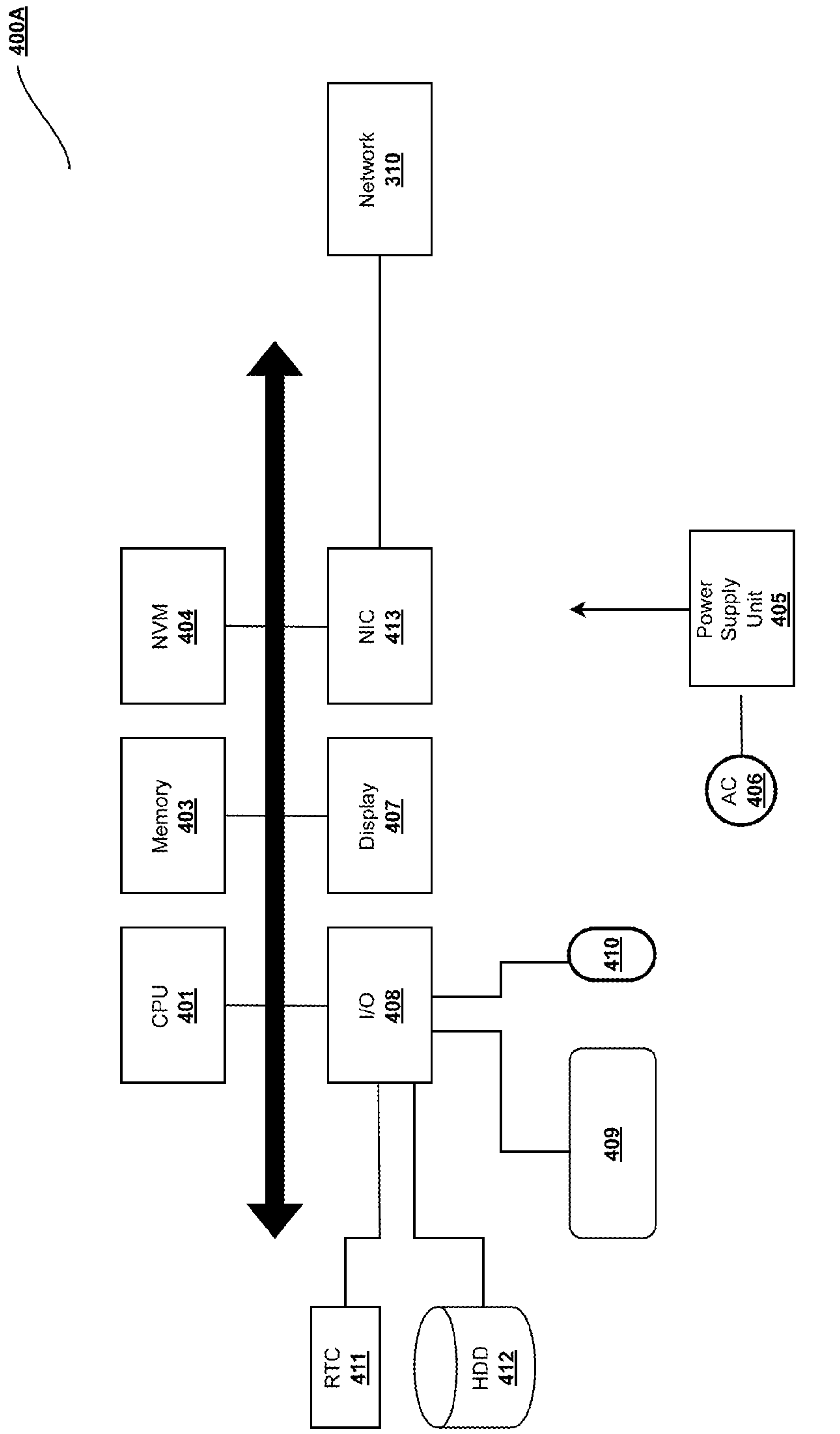
FIG. 4A is another block diagram illustrating an exemplary hardware architecture of a computing device used in various embodiments of the invention.

FIG. 4A shows an exemplary overview of a computer system 400A as may be used in any of the various locations throughout the system. It is exemplary of any computer that may execute code to process data. Various modifications and changes may be made to computer system 400A without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which may or may not have connections to the Internet. Also shown as part of system 400A is power supply unit 405 connected, in this example, to ac supply 406. Not shown are batteries that could be present, and many other devices and modifications that are well known but do not apply to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Figure 4B:
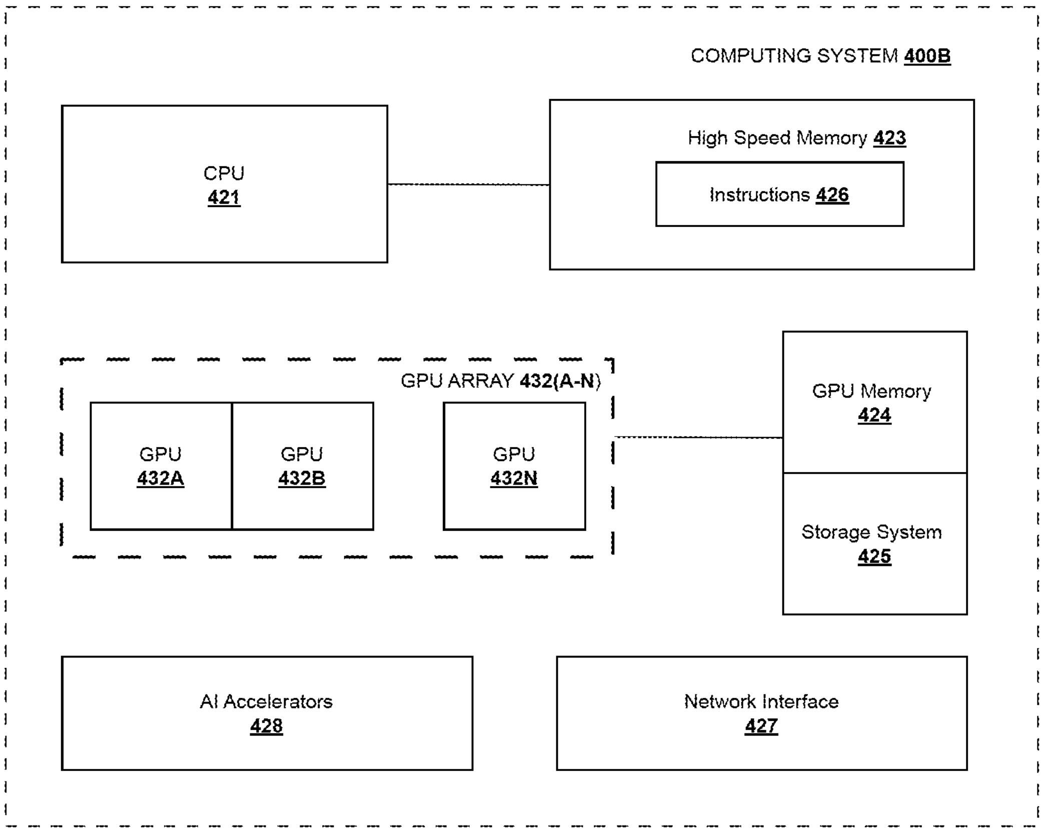
FIG. 4B shows a computing system configured to execute the computational methods described in this invention, in accordance with a preferred embodiment.

Referring to FIG. 4B, there is shown a computing system 400B configured to execute the computational methods described in this invention, in accordance with a preferred embodiment. Computing system 400B provides the computational infrastructure necessary to perform the intensive processing operations required by the system. Central Processing Unit (CPU) 421 comprises one or more high-performance processors with multi-core architecture configured to orchestrate communication between system components and manage overall workflow execution. CPU 421 executes control logic, handles API communications with external services, manages iterative processing loops, and performs sequential operations including data parsing, database queries, and coordination tasks. CPU 421 maintains bidirectional communication with high-speed memory for rapid data access and with accelerator hardware for computational offloading. In preferred embodiments, CPU 421 comprises server-grade processors with 8 to 128 cores operating at frequencies between 2.0 GHz and 5.0 GHz, providing the processing power necessary for managing concurrent operations across system components.

High-Speed Memory 423 comprises high-bandwidth random access memory (RAM) configured to store intermediate data structures, active model parameters, and working datasets during processing operations. High-speed memory 423 maintains loaded neural network model weights, active database portions, vectorized representations, intermediate computation results, and temporary data structures. Within High-Speed Memory 423 resides instructions 426 that include the executable software implementing the computational methodology described in this invention. In preferred embodiments, high-speed memory 423 comprises at least 32 GB to 512 GB of DDR4, DDR5, or HBM memory operating at speeds exceeding 3200 MHz to support rapid data access patterns required by the computational algorithms, with larger deployments utilizing up to 2 TB of memory for processing large-scale datasets.

Graphics Processing Unit (GPU) Array 432(A-N) comprises one or more graphics processing units or specialized tensor processing units configured to accelerate parallel computational operations inherent in machine learning and artificial intelligence systems. GPU Array 432(A-N) includes GPU 432A, GPU 432B, through GPU 432N, where N may range from 1 to 16 or more GPUs in distributed configurations. The array dramatically accelerates operations including matrix multiplications, convolution operations, transformer model inference, embedding generation, attention mechanisms, vector similarity computations, and other parallelizable operations common to neural network architectures. The GPUs communicate with CPU 421 via high-speed PCIe 4.0, PCIe 5.0, or CXL interconnects and with each other via NVLink, NVSwitch, Infinity Fabric, or similar GPU-to-GPU communication protocols, enabling efficient multi-GPU parallelization of large batch operations. Each GPU in the array processes different data batches simultaneously, allowing the system to handle high-throughput computational workloads. GPU Array 432(A-N) maintains bidirectional communication with GPU Memory 424 for rapid access to model parameters and computation tensors. In typical configurations, each GPU comprises NVIDIA A100, H100, L40S, AMD MI300, Intel Data Center GPU Max, or equivalent hardware with tensor cores or matrix engines optimized for AI workloads.

GPU Memory 424 comprises high-bandwidth memory (HBM2, HBM2e, or HBM3) or GDDR6/GDDR6X memory integrated with or closely coupled to the graphics processing units, providing extremely fast access to model parameters and computation tensors during neural network operations. GPU memory 424 stores neural network weights, intermediate activation values during forward and backward passes, embedding vectors for rapid similarity computations, gradient tensors during training operations, and cached computation results to minimize redundant operations. In typical configurations, each GPU in the array includes 16 GB to 192 GB of dedicated high-bandwidth memory with bandwidth ranging from 600 GB/s to 3 TB/s per GPU, enabling the rapid data movement required by modern AI architectures. GPU Memory 424 is co-located with Storage System 425, which provides persistent storage for frequently accessed data including model checkpoints, cached activations, and intermediate results. Storage System 425 comprises high-speed Non-Volatile Memory Express (NVMe) solid-state drives (SSDs) with transfer speeds exceeding 7 GB/s, enabling sub-millisecond access to critical data.

AI Accelerators 428 represent optional specialized hardware components that may supplement or replace GPU Array 432(A-N) for specific operations. AI accelerators 428 may comprise Google Tensor Processing Units (TPUs) optimized for matrix multiplication operations, custom Application-Specific Integrated Circuits (ASICs) designed for neural network inference or training, Neural Processing Units (NPUs) integrated with CPU architectures, Field-Programmable Gate Arrays (FPGAs) configured for specialized computational patterns, or other purpose-built hardware accelerators. These accelerators may be particularly advantageous for high-throughput operations, low-latency inference, specialized data transformations, or custom algorithmic implementations. AI Accelerators 428 communicate bidirectionally with CPU 421 for task coordination and data transfer. In some embodiments, AI Accelerators 428 may be deployed in a heterogeneous computing configuration alongside GPU Array 432(A-N), with the system dynamically assigning tasks to the most appropriate hardware based on workload characteristics, availability, and cost-efficiency considerations.

Network Interface 427 provides high-bandwidth connectivity to external networks and services. Network interface 427 enables bidirectional communication with external systems, cloud services, distributed computing resources, databases, and third-party APIs. Network interface 427 implements high-bandwidth connections ranging from 1 Gigabit per second (Gbps) to 400 Gbps to support concurrent operations and data transfers. The interface manages authentication via secure credential handling, implements rate limiting to respect service quotas, provides retry logic with exponential backoff for transient failures, and maintains connection pooling for efficient resource utilization.

Definitions

Communication patterns refer to patterns extracted from communication metadata. A pattern is derived from analysis of communication metadata including timing, frequency, channel preferences, response latencies, and behavioral characteristics without accessing communication content. Communication patterns represent observable, quantifiable characteristics of interactions between entities. Communication patterns, metadata patterns, and relationship patterns are synonymous terms used interchangeably throughout this specification, all referring to patterns derived exclusively from communication metadata analysis without accessing communication content.

Entity pair refers to two entities between whom a communication relationship exists, identified by their respective entity identifiers. Entity pairs serve as the fundamental unit for relationship analysis and training data generation. Qualified entity pair is an entity pair whose relationship strength score exceeds a predetermined threshold (typically 0.5-0.7), qualifying it for inclusion in training combination data generation.

Detailed Conceptual Architecture

Figure 5:
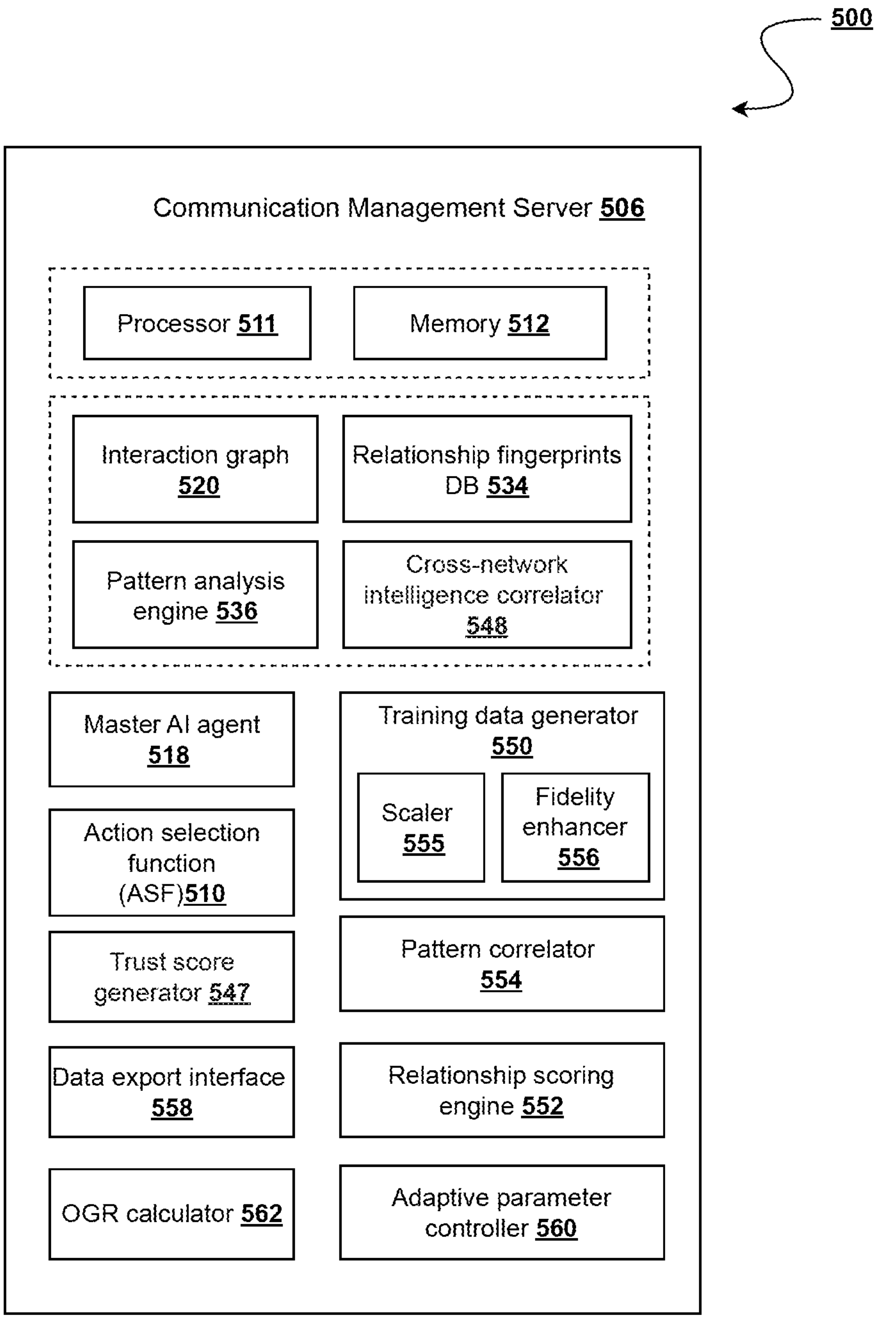
FIG. 5 is an example system architecture for relationship-based training data generation using the communication management server, according to an embodiment of the invention.

FIG. 5 is an example system architecture 500 for relationship-based training data generation using communication management server 506, according to an embodiment of the invention. System architecture 500 demonstrates how relationship intelligence gathered for communication processing purposes can simultaneously serve as a foundational source for exponential training data generation, creating a dual-purpose system that integrates relationship intelligence gathering with exponential training data generation, while simultaneously implementing adaptive optimization mechanisms that ensure continuous improvement of training data quality and quantity through ongoing operation.

System architecture 500 integrates two complementary operational domains within communication management server 506. First, a training data generation pipeline may continuously collect entity interaction metadata, updates relationship vectors, and regenerates $N(N-1)/2$ training combinations with quality-enhanced multipliers. Second, an adaptive monitoring and optimization system continuously measures organic growth rate, compares against performance targets, and automatically adjusts system parameters to maintain optimal training data generation.

Communication management server 506 may host multiple integrated components that operate on relationship metadata to produce both communication security services and AI training data. FIG. 5 shows a simplified communication management server 506 of FIG. 5 with emphasis on components used for generation of training data for AI systems. Communication management server 506 includes processor 511 and memory 512, which store and execute the specialized instructions that implement the relationship-based training data generation methodology.

Processor 511 executes the programming instructions that implement methods 1200 (FIG. 12), 1300 (FIG. 13), coordinating the various components to transform entity interaction data into exponentially scaled training data. Further, the processor implements method 1500 that coordinates with OGR calculation, threshold comparison, and stimulation mechanism triggers.

In an embodiment, processor 511 may be a multi-core CPU executing all programming instructions and orchestrating component workflows. Processor 511 maintains real-time awareness of system state, relationship vector evolution, OGR measurements, and parameter adjustments.

Memory 512 may store the programming instructions, intermediate processing results, and the databases that maintain relationship intelligence throughout the training data generation process. In an embodiment, memory 512 may store and maintain a plurality of programming instructions implementing relationship-based training data generation and adaptive optimization, intermediate processing results from each component operation, databases maintaining relationship intelligence throughout the system lifecycle, historical OGR measurements and stimulation adjustment logs, and current parameter settings for fidelity enhancement, temporal window configurations, and dimensional weighting. In an embodiment, memory 512 may be a high-speed RAM maintaining active relationship data structures, multi-dimensional relationship vectors, training combination databases, OGR historical records, and intermediate computation results for rapid access.

Communication management server 506 receives entity interaction data that includes communications between entities operating in healthcare, financial services, education, e-commerce, and social media domains. Entity interaction data encompasses all forms of digital communications including emails, text messages, voice calls, video conferences, instant messages, and social media interactions that occur between entities through the communication management system.

The entity interaction data received by communication management server 506 serves as the input to the training data generation pipeline. This data includes metadata such as timestamps, communication channel identifiers, interaction durations, and participant identifiers, but explicitly excludes communication content, message text, email subjects, voice call transcriptions, or any private information. This metadata-only approach ensures privacy compliance while enabling sophisticated communication pattern extraction. The system captures interaction data without accessing communication content, focusing exclusively on metadata patterns that preserve privacy while enabling relationship analysis.

The plurality of entities represents users, customers, clients, patients, students, or other participants who utilize the communication management server 506 for coordinating interactions across various professional and personal contexts. Multiple communication channels include email systems, messaging platforms, voice communication networks, video conferencing systems, social media platforms, and any other digital communication infrastructure through which entities conduct interactions.

Entity interaction data flows from the communication channels to pattern analysis engine 536, which initiates the training data generation process by extracting and analyzing metadata patterns. In an embodiment, pattern analysis engine 536 may be configured to process incoming communication metadata to identify communication patterns across temporal, frequency, and behavioral dimensions.

In an embodiment, pattern analysis engine 536 may receive entity interaction metadata and extract metadata patterns that are validated and stored in relationship fingerprints database 534. These patterns serve as input for vector creation and quality assessment.

In an embodiment, pattern analysis engine 536 may implement algorithms that extract distinct categories of metadata patterns: temporal patterns (timing distributions and frequencies), behavioral patterns (initiation tendencies and response characteristics), channel patterns (communication method preferences), interaction patterns (communication styles and turn-taking behaviors), trust patterns (consistency and reliability indicators), contextual patterns (professional vs. personal communications), and relationship patterns (engagement levels and relationship strength).

For each pattern category, pattern analysis engine 536 may calculate a pattern confidence score based on data completeness, temporal consistency, and behavioral coherence, and validates patterns against configurable confidence thresholds.

This validation process ensures that only high-quality, statistically significant patterns influence subsequent relationship scoring. Pattern analysis engine 536 operates exclusively through metadata analysis without accessing message content, ensuring complete privacy preservation while extracting sophisticated relationship insights. The validated patterns output by pattern analysis engine 536 serve as inputs to relationship scoring engine 552 for conversion to multi-dimensional relationship vectors.

In an embodiment, relationship scoring engine 552 may convert the validated patterns to multi-dimensional relationship vectors for each entity and compute relationship strength score. The multi-dimensional relationship vectors generated by relationship scoring engine 552 contain the temporal dimensions (capturing communication timing patterns, response latency patterns, and interaction duration patterns), behavioral dimensions (capturing engagement patterns, initiation patterns, and reciprocity patterns), communication frequency dimensions (capturing interaction frequency and cadence patterns), and channel preference dimensions (capturing communication channel usage patterns). Relationship scoring engine 552 may convert validated relationships between entities into multi-dimensional scores through relationship scoring methodology that processes the communication metadata. Detailed related to the process of conversion and score generation are described in FIG. 12.

In an embodiment, relationship fingerprints database 534 serves as the central repository for validated communication patterns identified through metadata analysis. Relationship fingerprints database 534 may store the complete multi-dimensional relationship vectors generated by relationship scoring engine 552, along with relationship strength scores, entity pair identifiers, domain identifiers, relationship labels, and quality metadata.

In an embodiment, relationship fingerprints database 534 may maintain multi-dimensional relationship scores representing entity relationships without storing any communication content. Relationship fingerprints database 534 may implement efficient storage structures optimized for relationship vector retrieval, using specialized indexing to support rapid access based on entity identifiers, relationship characteristics, or strength thresholds.

In an embodiment, relationship fingerprints database 534 provides storage for relationship intelligence that serves both communication security functions and training data generation, enabling continuous learning and pattern evolution through ongoing relationship updates. The relationship vectors and strength scores stored in relationship fingerprints database 534 are retrieved by training data generator 550 to identify qualified entity pairs and generate training combination data.

In an embodiment, trust score generator 547 may calculate relationship trust metrics based on behavioral patterns and historical interaction data, specifically generating the "trust score" dimension of the multi-dimensional relationship vectors. Trust score generator 547 may generates multi-attribute trust scores reflecting relationship strength and quality. Trust score generator 547 may analyze pattern consistency, historical accuracy, and behavioral coherence to generate trust evaluations based exclusively on observable metadata patterns. It implements temporal analysis algorithms that evaluate trust evolution over time, enabling the system to distinguish between developing, stable, and declining trust relationships. The generator incorporates multiple trust attributes including authentication behaviors, relationship authenticity markers, and consistency indicators into a unified trust dimension that significantly impacts overall relationship strength calculations.

Trust score generator 547 enables the system to quantify relationship reliability through sophisticated metadata analysis without requiring access to communication content, addressing a critical dimension of relationship quality while maintaining complete privacy protection. Trust score generator 547 contributes to the relationship characterization that enables high-quality training data generation, providing trust-related features that are particularly important for healthcare, financial services, and other domains where relationship reliability is critical.

In an embodiment, training data generator 550 may process validated communication patterns into exponentially scaled AI training data. Training data generator 550 may identify qualified entity pairs based on relationship strength thresholds, ensuring that only meaningful relationships proceed to training data generation. It creates all possible unique entity pairs from qualified entities while avoiding duplicate pairs and self-references. The combination generation process creates all possible unique entity pairs from qualified entities while avoiding duplicate pairs and self-references. Each entity pair is associated with its corresponding multi-dimensional relationship vector and relationship strength score.

In an embodiment, scaler 555 may process relationship combinations into optimized training data formats, performing the mathematical scaling function that supports the $N(N-1)/2$ combination formula. Scaler 555 implements mathematical transformations and normalization algorithms that enable efficient processing of the combinatorial explosion inherent in $N(N-1)/2$ scaling. Scaler 555 implements mathematical transformations that convert raw relationship combinations into feature vectors, target labels, and associated metadata for each relationship combination.

Training data generator 550 outputs training combination data where each combination comprises a multi-dimensional vector with multiple dimensions (temporal, behavioral, frequency, channel), a relationship label indicating relationship classification between the entity pair, and a domain identifier specifying the source domain.

In an embodiment, each training combination data may include a multi-dimensional vector with multiple dimensions, a relationship label and a domain identifier. Further, for each training combination data, training data generator 550 may compute Temporal Evolution Contribution (TEC) and Quality Multiplication Factor (QMF).

TEC measures training data generation rate from vector evolution and QMF computes quality enhancement based on relationship age (1.0× at 1 month, 1.5× at 6 months, 2.0× at 12 months, 2.5× at 24 months)

In an embodiment, organic growth rate calculator 562 may periodically measure the system's training data generation performance. This measurement represents the quantity of new, valuable training data generated purely from temporal evolution of existing relationships, with zero requirement for external data acquisition In an embodiment, adaptive parameter controller 560 may execute parameter adjustments when OGR falls below target threshold. When the measured OGR falls below the target threshold, adaptive parameter controller 560 automatically adjusts system parameters to optimize organic growth rate. Details related to TEC, QMF, OGR and adaptive parameter controller 564 are described in FIGS. 14-16.

In an embodiment, fidelity enhancer 556 may enhance training data quality through epistemic characteristics including temporal layering, behavioral evolution, and contextual adaptivity. The training combination data may be enhanced using epistemic fidelity characteristics to generate training data that is emotionally resonant, temporally layered, symbolically rich, and contextually adaptive.

Fidelity enhancer 556 transforms basic relationship data into rich, nuanced training data with characteristics that make it especially valuable for AI learning, creating training resources that are emotionally resonant, temporally layered, symbolically rich, and contextually adaptive. The fidelity enhancement process significantly increases training data effectiveness, enabling AI systems to learn more sophisticated relationship understanding from fewer examples compared to traditional training approaches.

In an embodiment, fidelity enhancer 556 may implement fidelity processing functions by applying four distinct fidelity characteristics to the training combination data: temporal layering (analyzing temporal evolution patterns to create temporally layered information), emotional resonance (extracting emotional resonance indicators from behavioral patterns and trust scores), symbolic richness (generating symbolic richness through contextual pattern analysis across multiple communication channels), and contextual adaptivity (applying contextual adaptivity by incorporating environmental factors, situational relationship contexts, and domain-specific relationship characteristics.

In an embodiment, fidelity enhancer 556 may analyze temporal evolution patterns within relationship combinations to create temporally layered information that captures how relationships develop and change over time. Fidelity enhancer 556 may extract emotional resonance indicators from behavioral patterns and trust scores, generating training data with sophisticated emotional intelligence characteristics.

In an embodiment, fidelity enhancer 556 may implement contextual adaptivity by incorporating environmental factors, situational relationship contexts, and domain-specific relationship characteristics into the training data enhancement process. Fidelity enhancer 556 creates symbolically rich training data through pattern correlation across multiple communication dimensions, enabling artificial intelligence systems to recognize subtle relationship signals and contextual nuances.

The enhanced training data output by fidelity enhancer 556 is delivered to AI systems through data export interface 558, completing the training data generation pipeline that transforms entity interaction data into exponentially scaled, high-fidelity training data suitable for AI consumption. In an embodiment, cross-network intelligence correlator 548 may identify pattern similarities across different communication channels and validates relationship context.

In an embodiment, fidelity enhancer 556 implements cross-domain learning methodology enabling training data from one application domain to enhance artificial intelligence performance across multiple domains simultaneously through universal relationship pattern recognition. It analyzes relationship patterns across multiple domains to identify common characteristics that transcend domain-specific contexts.

In an embodiment, cross-network intelligence correlator 548 may create connections between domain-specific relationship characteristics and universal relationship features using pattern correlation algorithms that discover non-obvious similarities between different domain patterns. Cross-network intelligence correlator 548 creates a multiplication effect where training data generated in one domain (such as healthcare) can enhance AI training in other compatible domains (such as financial services and education), further amplifying the exponential training data advantage beyond the N(N−1)/2 scaling within individual domains.

In an embodiment, pattern correlator 554 may identify and correlate patterns across entity pairs. Pattern correlator 554 may identify similarities between communication patterns and validate them against known legitimate patterns, ensuring that only high-quality relationships proceed to training data generation. Pattern correlator 554 may implement sophisticated pattern matching algorithms that compare newly identified patterns against established relationship models stored in the system. Pattern correlator 554 may calculate similarity metrics that quantify the degree of alignment between observed patterns and known legitimate communication patterns. Pattern correlator 554 performs multi-dimensional pattern comparison that evaluates similarity across all seven relationship dimensions simultaneously, enabling pattern validation that considers the complete relationship context.

Pattern correlator 554 supports both the quality assurance function within pattern analysis engine 536 (ensuring validated patterns are statistically significant and behaviorally coherent) and the cross-domain compatibility analysis within cross-network intelligence correlator 548 (comparing patterns across domains to identify universal characteristics). This dual role enables pattern correlator 554 to maintain training data quality while enabling cross-domain learning.

In an embodiment, master AI agent 518 may coordinate operations between communication management functions and training data generation processes, performing the orchestration function that ensures all system components work together efficiently. Master AI agent 518 agent may implement supervisory control algorithms that manage data flow, process scheduling, and resource allocation across the entire system architecture. Master AI agent 518 monitors component performance and system health, implementing adaptive resource management that optimizes computational efficiency while maintaining processing quality.

Master AI agent 518 may implement coordinated processing strategies that enable simultaneous communication security and training data generation without resource conflicts or performance degradation.

In an embodiment, action selection function (ASF) 510 coordinates the training data delivery process by determining optimal delivery formats and implementing adaptive switching between reinforcement learning approaches 510 may handle the delivery function of generated training data to AI systems, implementing adaptive reinforcement learning switching logic that determines whether model-based reinforcement learning, model-free reinforcement learning, or dynamic switching between approaches should be used for training data delivery. ASF 510 may implement adaptive reinforcement learning switching logic that determines whether model-based reinforcement learning, model-free reinforcement learning, or dynamic switching between approaches should be used for training data delivery. ASF 510 works in coordination with data export interface 558 to implement the complete adaptive delivery pipeline, ensuring that the N(N−1)/2 training combinations (with their multi-dimensional vectors, relationship labels, and domain identifiers) are packaged and delivered to AI systems in the format most effective for each specific training context.

Master AI agent 518 creates a unified operational framework that maximizes infrastructure efficiency through dual-purpose processing, enabling the system to serve both communication security and training data generation functions with minimal computational overhead compared to separate, dedicated systems.

In an embodiment, action selection function (ASF) 510 may determine optimal actions based on communication patterns, supporting both communication routing decisions and training data qualification choices. Based on analysis of relationship context, data availability, and computational requirements, ASF 510 selects the optimal delivery format and monitors performance to ensure the exponentially generated training data is delivered in formats that maximize training effectiveness for each specific scenario.

In an embodiment, data export interface 558 may be configured to deliver generated training data to AI systems through adaptive mechanisms that select optimal delivery methods based on data characteristics and receiving system capabilities. Data export interface 558 delivers generated training data to AI systems through adaptive mechanisms that select optimal delivery methods based on data characteristics and receiving system capabilities.

Data export interface 558 may execute the delivery actions specified by ASF 510, transforming training combination data into model-based formats (state-space representations, transition matrices, reward functions for Markov Decision Processes or model-free formats (experience sequences, state-action-reward-next state tuples for neural network processing) depending on the delivery context evaluation and approach selection.

In an embodiment, interaction graph 520 may provide relationship context and historical interaction data that informs pattern analysis and relationship scoring throughout the training data generation process. Interaction graph 520 may be a storage of entity relationship graph, with nodes representing entities and edges representing interactions. Interaction graph 520 maintains comprehensive records of entity interactions, relationship evolution, and communication patterns that enable pattern analysis engine 536 to extract validated patterns and relationship scoring engine 552 to generate accurate multi-dimensional relationship vectors. The interaction graph serves as the knowledge base that captures relationship intelligence derived from entity interaction data, enabling both communication management functions and training data generation to leverage accumulated relationship understanding for improved decision-making and data quality.

During continuous generation phase, pattern analysis engine 536 may receive entity interaction metadata and extracts patterns that are stored in relationship fingerprints database 534. These patterns are validated and transformed by relationship scoring engine 552 into multi-dimensional vectors. Training data generator 550 may receive these vectors and apply the N(N−1)/2 formula to generate training combinations. Fidelity enhancer 556 enhances the quality of generated combinations through epistemic characteristics. Data export interface 558 delivers the final training data to external systems for use in AI model training.

During periodic monitoring and optimization phase OGR calculator 562 measures organic growth rate:

$$OGR = \left(\sum TEC \times \text{Average } QMF\right)/\text{Measurement\_Window\_Duration}$$

Processor 511 compares measured OGR against configurable target threshold. If OGR is greater than a target threshold system continues normal generation. If OGR is below the target threshold, processor 511 signals adaptive parameter controller 560 for trigger stimulation by adjusting fidelity, temporal window, and/or dimensional weighting. System enters new measurement cycle with adjusted parameters.

System architecture 500 demonstrates the capability to perform dual-purpose processing, where the same relationship intelligence gathered for communication management simultaneously creates exponentially scaled training data for AI systems. This unified architecture implements privacy-preserving design principles where all processing occurs through metadata analysis without ever requiring access to communication content or private messages.

System architecture 500 addresses fundamental limitations in current AI approaches by implementing relationship-based training data generation that transforms linear entity processing into exponential training data production. The architecture creates a self-improving system where feedback loops between component processes enable continuous refinement and optimization, progressively increasing both training data volume and quality through operational experience. This architecture represents a fundamental advancement in artificial intelligence training approaches, establishing relationship-based artificial intelligence as a distinct processing paradigm that provides exponential scaling advantages compared to traditional data-based artificial intelligence methodologies.

Detailed Description of Exemplary Embodiments

Figure 6:
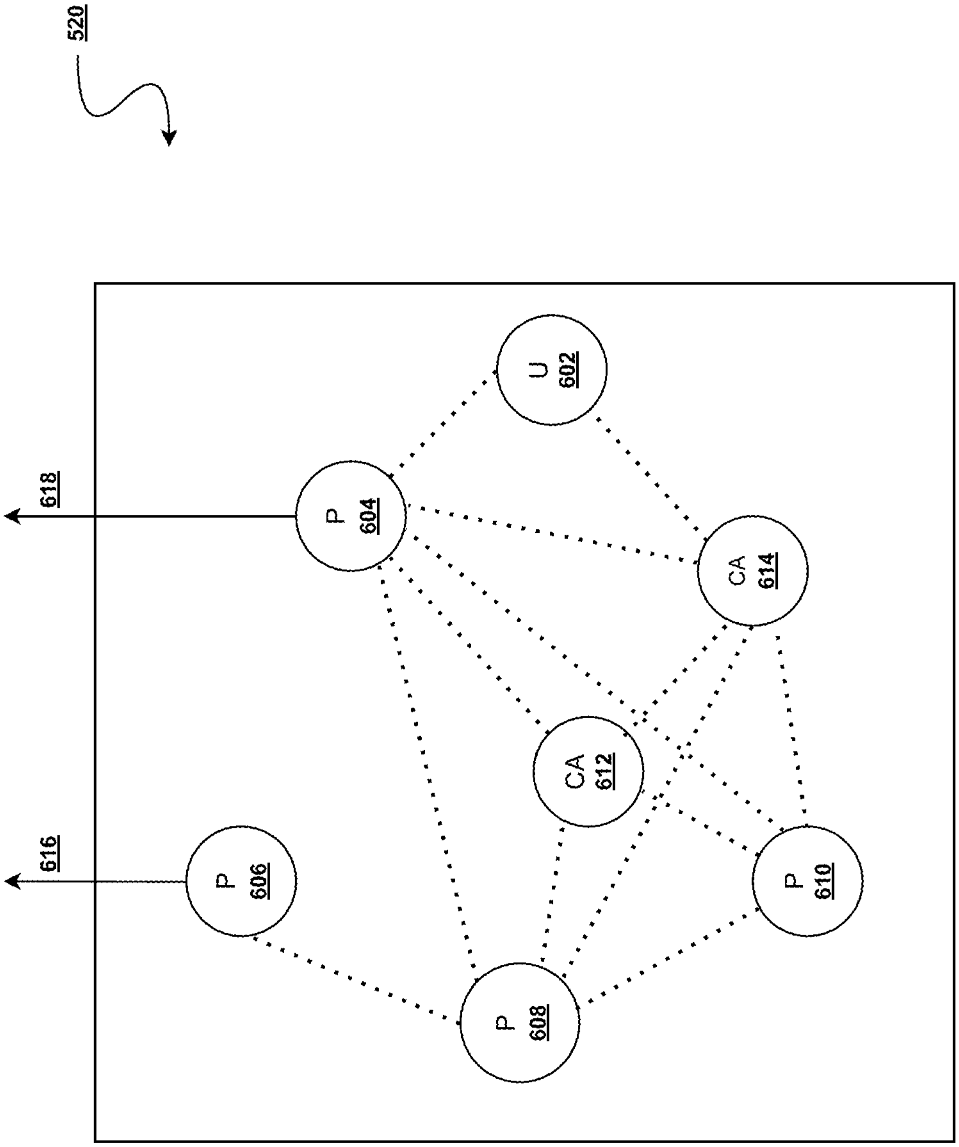
FIG. 6 is an illustration of an interaction graph, according to an embodiment of the invention.

FIG. 6 is an illustration of an interaction graph 520, according to an embodiment of the invention. In this simplified view device nodes are not shown, only party nodes. Each circular node labeled P corresponds to a person, "party", "entity" or "contact," and a registered user may be labeled "U," and the AI communication agents are labeled CA. Registered entity U-602 may use devices (not shown in this figure) for communication. Interaction graph 520 may be stored in memory 512. Interaction graph 520 represents entities (people, companies and software agents) as nodes with relationships and relationships or affinities as edges. The dotted edges in the interaction graph 520 may depict communications interaction relationships between registered entities U-602, with known contacts (P-604, P-606, P-608, P-610), and AI communication agents CA-612 and CA-614. In one embodiment, the edges are weighted by the number of historical interactions between entity pairs and where the absence of an edge indicates no previous direct historical interactions.

In FIG. 6, node U-602 represents a registered entity as a center point or "root" of their interaction network. Surrounding party nodes (P-604, P-606, P-608, and P-610) represent other entities connected to the entity. These may include friends, family, coworkers, and acquaintances, but may also represent the source of incoming communications from people or spam bots entirely unknown to the user. AI communication agents CA-612 and CA-614 may be actively connected with users and contacts dynamically by the master AI agent 518 when making decisions about incoming communications by considering relationships, common attributes, and history.

In an embodiment, AI communication agents at nodes CA-612 and CA-614 may be configured by master AI agent 518 to interact with specific parties. In an embodiment, solid lines 616 and 618 in FIG. 6 may represent actual communication session attempts towards the device of entity 602 triggered from entities P-606 and P-604 respectively. In this example, attempt 618 represents a repeat connection between entities P-604 and U-602 which already have a strong direct communications interaction relationship, whereas attempt 616 represents an attempt to make an initial connection from a device of entity P-606 to a device of entity U-602, which has only a single third level human connection via P-608 and P-604.

Figure 7:
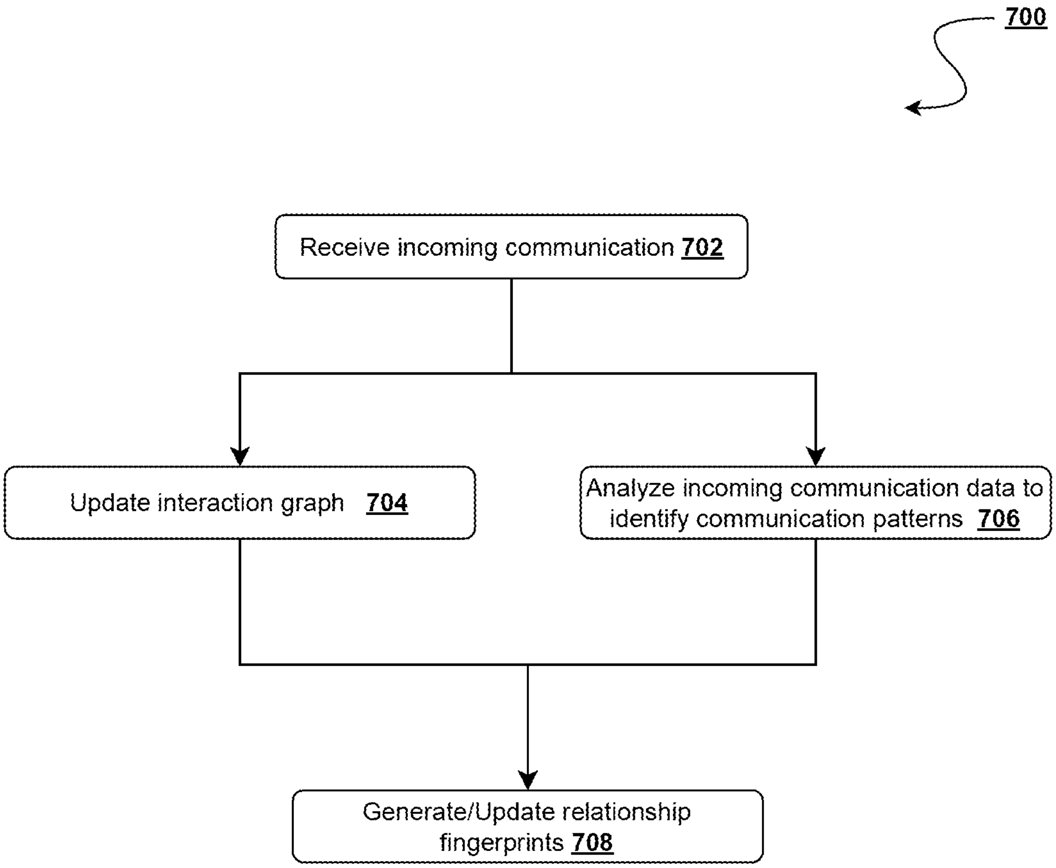
FIG. 7 is a flow of an example method for generating relationship fingerprints, according to an embodiment of the invention.

FIG. 7 is a flow of an example method 700 for generating relationship fingerprints, according to an embodiment of the invention. Relationship fingerprints may be generated from interaction graph 520 data and communication patterns and may be constantly updated with the processing of new incoming communications. Relationship fingerprints offer relationship characteristics and may be indicative of established communication behaviors.

At step 702, communication management server 506 may receive an incoming communication via multimedia gateway. The incoming communication may be directed towards an entity among the plurality of entities registered with communication management server 506. The incoming communication may be a voice message, an audio call, a text message, an email, or a video communication.

In an embodiment, relationship fingerprints may provide the unique characteristics of a communication relationship between two entities, and it may include temporal patterns (timing, frequency, duration), channel preferences patterns (voice, text, email), response behaviors (speed, consistency), engagement levels, and relationship context.

The fingerprint continuously evolves as the relationship develops, making it increasingly precise in distinguishing legitimate communications from unwanted ones. Each relationship generates its own unique fingerprint that adapts over time, enabling sophisticated pattern matching while preserving complete privacy since no message content is ever accessed or stored.

At step 704, interaction graph 520 is updated with context associated with the incoming communication. Interaction graph 520 may maintain nodes representing entities and devices, edges representing relationships, and stores communication history and patterns. Interaction graph 520 provides relationship context. For example, new nodes may be added in case of receiving communication from new entities, and edge weights may be updated based on interaction frequency from the identified communication patterns.

At step 706, pattern analysis engine 536 may analyze the metadata associated with the incoming communication data to identify patterns. Pattern analysis engine 536 extracts communication patterns present in communication metadata including timing, frequency of communication, channel preferences, and network-level characteristics without accessing communication content.

At step 708, relationship fingerprint is generated or updated based on the interaction graph 520 data and communication patterns. In case the incoming communication is from a new/unknown user, a new relationship fingerprint may be generated. In case the communication is from a known user and the communication pattern is new, existing relationship fingerprints may be updated with the new pattern.

Each relationship (between two entities) generates its unique fingerprint that adapts over time, enabling sophisticated pattern matching while preserving complete privacy since no message content is ever accessed or stored.

Figure 8:
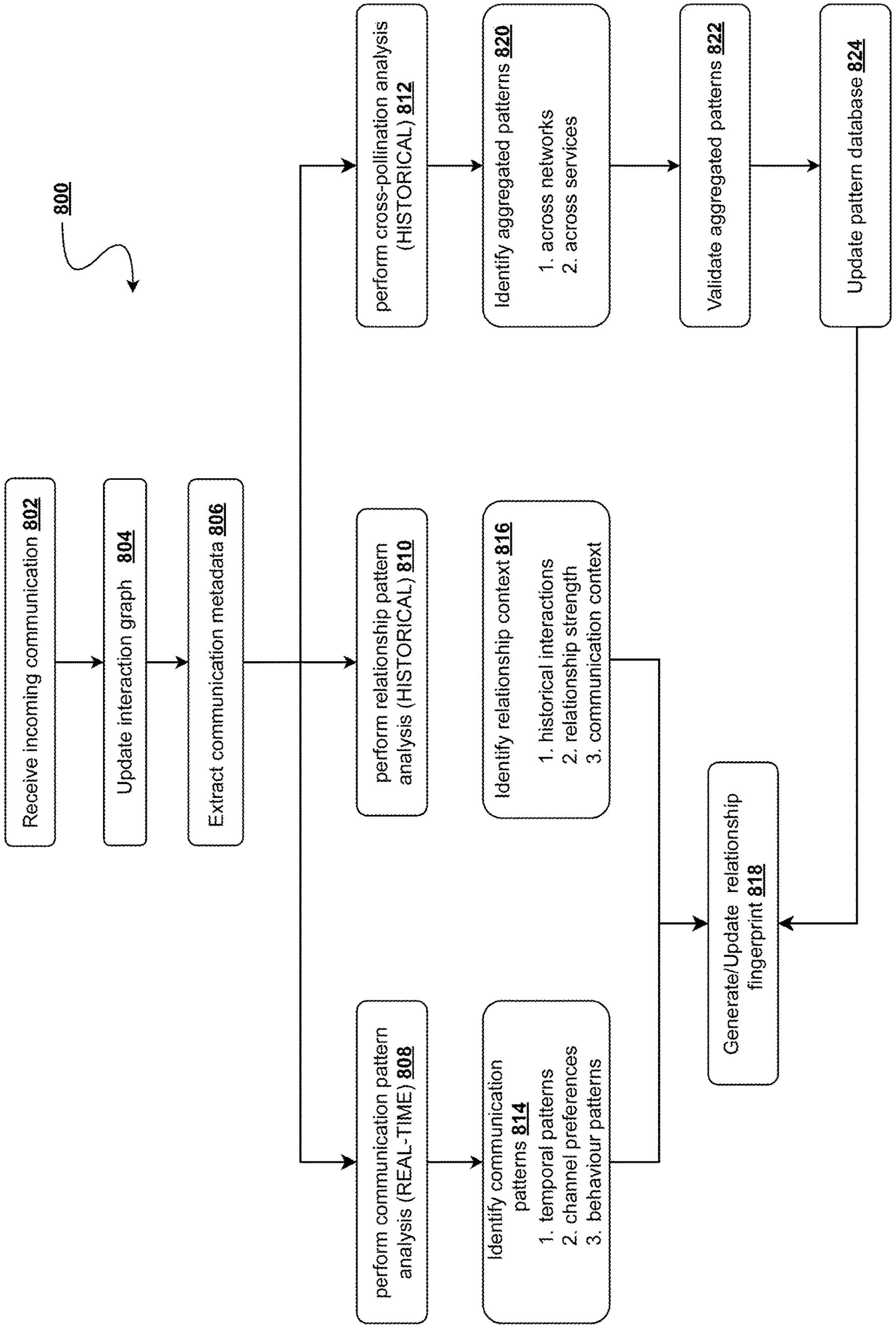
FIG. 8 is a flow diagram of an example method for analyzing the incoming communication metadata to identify communication patterns.

FIG. 8 is a flow diagram of an example method 800 for analyzing the incoming communication metadata to identify patterns.

At step 802, communication management server 506 may receive an incoming communication via multimedia gateway. The incoming communication may be directed towards a first-user device among the plurality of user devices associated with entities. The incoming communication may be a voice message, an audio call, a text message, an email, or a video communication.

At step 804, interaction graph 520 may be updated with context associated with the incoming communication. For example, new nodes may be added in case of receiving communication from new user devices. Interaction graph 520 may maintain nodes representing entities and devices, edges representing relationships, and stores communication history and patterns. Interaction graph 520 provides relationship context. In an embodiment, based on the identified communication patterns interaction graph 520 may be updated. Edge weights may update based on interaction frequency from the identified communication patterns.

At step 806, pattern analysis engine 536 may extract communication metadata associated with the incoming communication data to identify patterns. Pattern analysis engine 536 extracts communication patterns present in communication metadata including timing, frequency of communication, channel preferences, and network-level characteristics without accessing communication content.

Once the metadata is available, pattern analysis engine 536 may perform different types of analysis simultaneously with the available communication metadata.

In an embodiment, at step 808, pattern analysis engine 536 may perform real-time communication pattern analysis to handle immediate pattern detection in incoming communications. At step 814, pattern analysis engine 536 may extract communication patterns related to three main categories: temporal patterns, channel preference patterns, and behavioral patterns. Temporal patterns may be indicative of when and how often people communicate. Temporal patterns may include timing-based patterns like response times, communication frequency, and preferred contact hours. For example, temporal patterns may indicate that a user always responds to work emails within an hour during business hours but takes longer on weekends.

At step 816, pattern analysis engine 536 may identify relationship context based on the historical relationship patterns analyzed at step 810. Relationship context identification comprises three primary components: historical interactions, relationship strength, and communication context.

Historical interactions capture the complete interaction history between the entity pair, including the total number of communications exchanged, the duration of the relationship from first contact to present, interaction milestones such as periods of increased engagement or communication gaps, and evolution of communication patterns over the relationship lifecycle. This historical perspective enables pattern analysis engine 536 to distinguish between established relationships with deep interaction history and newer relationships still developing communication patterns.

Relationship strength quantifies the overall quality and reliability of the relationship based on accumulated pattern evidence. Relationship strength indicators include communication consistency measured through regularity and predictability of interactions, reciprocity balance indicating mutual engagement between entities, response reliability reflecting consistent response behaviors over time, and engagement depth measuring the substantive nature of interactions. Higher relationship strength scores indicate more established, reliable relationships that generate higher-confidence patterns for subsequent processing.

Communication context identifies the situational and environmental factors that characterize the relationship's communication patterns. Communication context indicators include professional versus personal classification based on temporal patterns such as business hours versus evening and weekend communications, formal versus informal communication style markers derived from channel selection and response timing, routine versus urgent communication patterns based on response latency variations, and role-based relationship indicators such as service provider and client, peer-to-peer, or hierarchical communication patterns. The identified communication context enables pattern analysis engine 536 to appropriately interpret patterns within their situational framework, ensuring that context-appropriate behaviors are recognized as legitimate relationship characteristics.

The relationship context identified at step 816, combined with the real-time communication patterns identified at step 814, provides comprehensive input for relationship fingerprint generation and update at step 818.

Channel preference patterns highlight preferred communication methods like calls vs. texts, or switching between channels. For example, a user may prefer using text for quick updates and calls for complex discussions. Similarly, channel-switching behaviors (starting with email and then moving to calls for urgent matters) may also be identified.

Behavioral patterns may indicate interaction styles (brief vs. detailed responses), engagement levels (active participation vs. passive responses), and relationship-specific communication habits (formal with clients, casual with teammates).

In an embodiment, behavioral patterns are extracted exclusively from quantifiable metadata without accessing communication content semantics. The term "interaction style" referenced in behavioral pattern analysis refers to structural characteristics determinable from metadata headers and system logs, not message content.

Pattern analysis engine 536 may analyze message size characteristics available in metadata, including byte count or character count in message metadata. Such metadata is available in email headers, SMS metadata, and voice duration records without requiring access to the actual message content. Classification thresholds are applied to categorize interaction styles based on message size: messages less than 500 bytes indicate a brief communication style; messages between 500 and 2000 bytes indicate a standard communication style; and messages exceeding 2000 bytes indicate a detailed communication style. This approach preserves complete privacy by examining only size metadata without accessing exact message content.

In an embodiment, the system derives engagement intensity indicators from message timestamp metadata compared against historical communication patterns from the same sender. Message timestamps are extracted from communication metadata without requiring content examination. Response patterns are categorized based on temporal delays: responses received within five minutes of the prior communication indicate high engagement and real-time availability; responses received between five minutes and sixty minutes indicate normal engagement levels; and responses received after more than two hours indicate lower urgency or offline status of the recipient. These timing patterns create behavioral fingerprints without any access to message semantic content.

In an embodiment, pattern analysis engine 536 may analyze communication frequency clustering by tallying interaction counts per time period from metadata timestamps. High-frequency clustering, characterized by multiple interactions per day between the same entities, indicates an informal relationship structure with ongoing engagement. Low-frequency clustering, characterized by weekly or monthly interactions, indicates a formal relationship structure with defined communication intervals. Frequency clustering patterns are determinable exclusively from interaction count metadata and temporal distribution, without examining message content.

In an embodiment, the system derives behavioral indicators from the types of communication channels used by each sender, as recorded in metadata channel-type fields. Single-channel exclusive usage, such as exclusive reliance on email for all communications, represents a formal communication style marker. Multi-channel mixing, characterized by the sender utilizing email, SMS, and voice across different communications, represents a casual communication style marker. Channel selection data is a metadata field available in communication headers without requiring content analysis.

In an embodiment, pattern analysis engine 536 may analyze conversation structure through thread and conversation chain metadata without examining message content. Linear threading patterns, characterized by sequential single-threaded conversations following a strict hierarchy, indicate formal or task-oriented communication styles. Parallel conversation patterns, characterized by multiple overlapping topics or simultaneous conversation threads, indicate casual or relationship-oriented communication styles. Message thread metadata reveals structural patterns without any requirement to examine the semantic content of communications.

These metadata-derived behavioral indicators create comprehensive behavioral fingerprints enabling pattern analysis without any access to message semantic content, maintaining complete privacy while identifying meaningful interaction style characteristics. The system never reads the actual message content, never stores message content for pattern analysis purposes, and never transmits message content to pattern database 538. Only quantifiable metadata fields including timestamps, byte counts, channel types, and thread identifiers are processed for behavioral pattern extraction.

In an embodiment, at step 810, pattern analysis engine 536 may perform historical communication pattern analysis to determine relationship strength, context patterns, and interaction history. Relationship strength may be determined based on the depth and frequency of past interactions.

In an example, relationship strength may be measured through factors like communication consistency (regular weekly meetings vs. sporadic interactions), the longevity of the relationship (years of steady contact vs. recent connections), and interaction depth (detailed collaborative projects vs. surface-level exchanges).

The context patterns may be identified based on the different situations and topics in the incoming communication. In an example, context patterns may include recurring discussion topics (regular financial reviews with clients), situational triggers (emergency response patterns), and role-based interactions (manager-employee one-on-ones).

Interaction history may track how relationships evolve between the entities, such as a customer relationship progressing from initial inquiry to long-term account, including changes in communication frequency, formality levels, and trust indicators.

The real-time communication patterns identified at step 814 and historical relationship context patterns identified at step 816 may be used for the generation of a relationship fingerprints between the entities. This relationship fingerprints are constantly updated based on changing patterns, and context between the entities. Further, the relationship fingerprint is also updated with aggregated patterns generated across different services and In an embodiment, at step 812, pattern analysis engine 536 may perform cross-pollination analysis, to identify common patterns across services and entities/networks. Cross-pollination analysis identifies communication patterns that are found across different services, entities, and networks.

At step 820, pattern analysis engine 536 may identify common patterns that are emerging across different services, users, and networks. In an embodiment, pattern analysis engine 536 may perform cross-pollination pattern analysis by examining communication behaviors across different network types—cellular, VoIP, messaging platforms, etc. This multi-network view enables the detection of sophisticated patterns that might be invisible when looking at a single network. For example, a legitimate business relationship may show consistent patterns across email, voice, and messaging, while fraudulent communications often show inconsistent patterns across different channels.

Any aggregated pattern identified by cross-pollination analysis is normalized so they can be comparable and validated by pattern analysis engine 536. At step 822, pattern analysis engine 536 may validate the identified aggregated patterns by checking the authenticity of pattern against known legitimate patterns, absence of conflicting patterns, cross-service pattern matches, and pattern consistency based on expected relationship behavior from relationship fingerprints.

Through cross-pollinated analysis, pattern analysis engine 536 continuously strengthens its pattern recognition capabilities. When similar patterns are observed across different services (email, voice, messaging), the communication management servers 506 understanding of those patterns becomes more refined and accurate. This learning occurs while maintaining strict privacy boundaries and no personal information or content is shared between services.

At step 822, once the aggregated patterns are validated, then at step 824 a pattern database 538 may be updated. The aggregated patterns stored in pattern database 538 may be used by pattern analysis engine 536 while processing incoming communication. The aggregated patterns may be stored with pattern version, timestamp, source information, and pattern relationship.

Along with using patterns in relationship fingerprints, pattern analysis engine 536 may use aggregated patterns to process incoming communication. Further, in some embodiments, relationship fingerprints may be updated with aggregated patterns.

By analyzing patterns (aggregated patterns) across services and networks, communication management server 506 may be able to identify emerging threat patterns before they become widespread. When unusual patterns are detected in one area, this information is abstracted and shared across the network to enable proactive protection. This creates a self-strengthening security system that becomes more effective as attack patterns evolve, without requiring access to communication content. For example, the same spam pattern may be received by users across voice, SMS, and Email. When a spam pattern is added to communication patterns in relationship fingerprints, any incoming communication with this pattern can be identified, even if the incoming communication has a valid relationship context.

Figure 9:
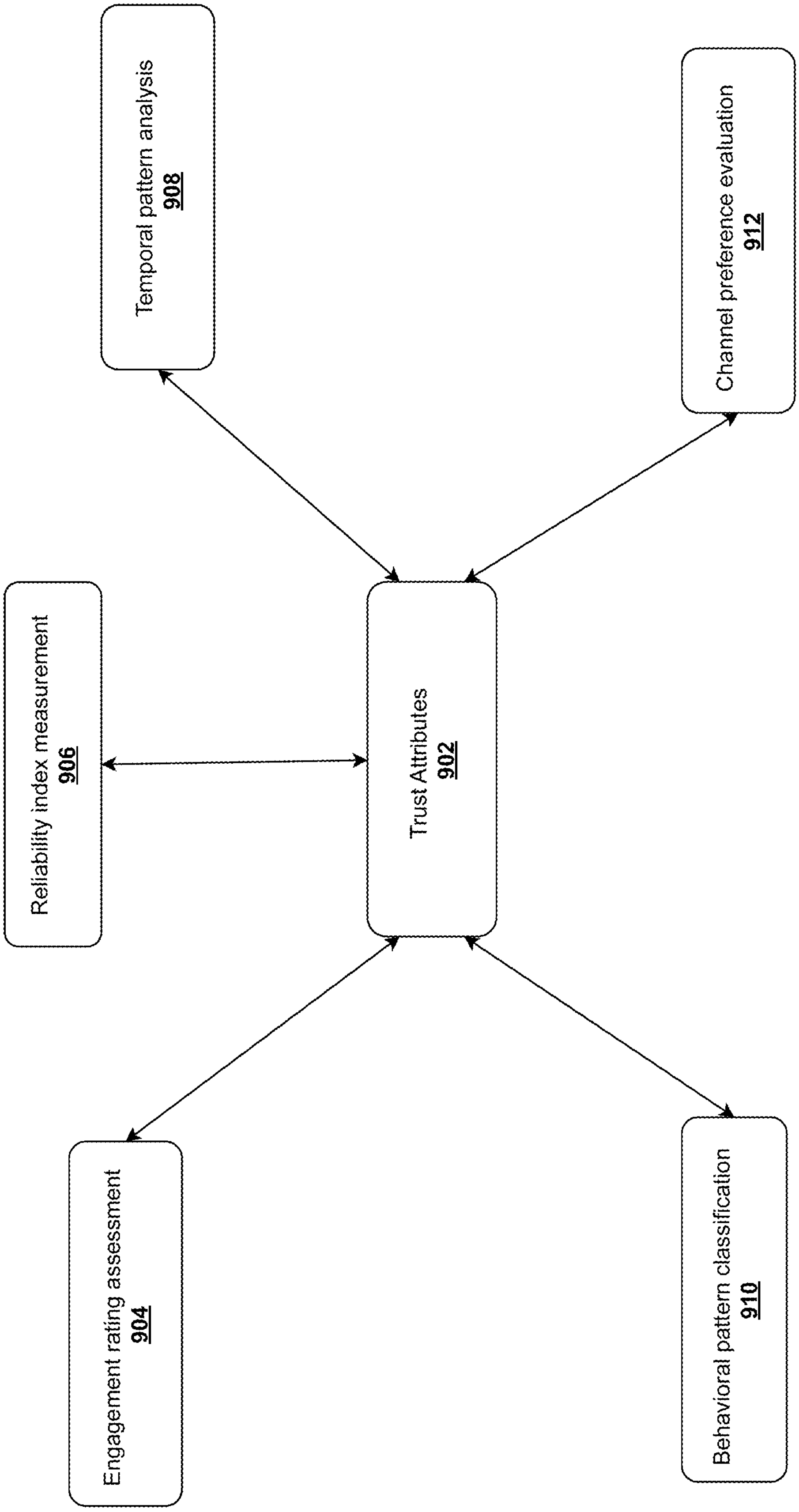
FIG. 9 illustrates different attributes that are considered while generating a multi-attribute trust score, according to an embodiment of the invention.

FIG. 9 illustrates different attributes that are considered while generating a multi-attribute trust score, according to an embodiment of the invention. Trust attributes 902 represent the core components that capture different dimensions of communication relationships and provide nuanced trust assessment capabilities that go beyond simple binary classifications.

In an embodiment, engagement rating assessment 902 component may analyze communication frequency, interaction duration, and bidirectional engagement metrics to determine the level and quality of engagement between communicating entities. Engagement rating assessment 902 processes historical interaction data from interaction graph 520 to calculate metrics including average communication frequency, typical interaction duration, response consistency, and mutual engagement indicators. This assessment is indicative of how actively the entities have communicated in the past and provides context for interpreting the current communication within the broader relationship dynamic. The engagement rate is calculated using the formula:

Engagement Rate=(Total Interactions×Average Duration×Reciprocity Factor)/Time Period, where Reciprocity Factor measures bidirectional engagement quality on a scale of 0.1 to 1.0.

In an embodiment, reliability index measurement 906 component may evaluate the consistency and dependability of communication patterns between entities by analyzing factors such as predictable timing, consistent channel usage, and reliable response behaviors. Reliability index measurement 906 tracks temporal consistency patterns, channel preference stability, and response time reliability to generate scores that indicate the predictability and trustworthiness of the communication relationship. High reliability scores suggest established, consistent communication patterns, while lower scores may indicate new relationships or evolving communication dynamics. The reliability index is calculated as:

Reliability Index=(Temporal Consistency×Channel Consistency×Response Consistency)/3, where each consistency factor is measured on a 0-100 scale.

In an embodiment, temporal pattern analysis 908 component processes timing-related characteristics of communications including preferred contact hours, response timing patterns, communication frequency trends, and temporal consistency indicators. Temporal pattern analysis 908 examines historical timing data to identify when communications typically occur, how quickly entities respond to each other, and whether current communication timing aligns with established patterns. This analysis enables the system to detect unusual timing that might indicate fraudulent communications or legitimate changes in communication circumstances. Temporal patterns are scored using statistical analysis of historical timing data with standard deviation calculations to identify pattern consistency.

In an embodiment, behavioral pattern classification 910 component analyzes interaction styles and engagement behaviors characteristic of the communication relationship, including formal versus informal communication styles, brief versus detailed exchanges, and active versus passive engagement patterns. Behavioral pattern classification 910 processes communication metadata to identify consistent behavioral characteristics that define how entities interact with each other, enabling recognition of authentic communication styles and detection of potential impersonation attempts. Behavioral patterns are classified using machine learning algorithms that analyze metadata characteristics including communication length, response timing, and interaction complexity.

In an embodiment, channel preference evaluation 912 component determines preferred communication methods and channel usage patterns for the relationship, analyzing historical channel selection data to identify primary and secondary communication preferences. Channel preference evaluation 912 tracks how entities typically choose between voice calls, text messages, emails, and other communication channels, providing context for whether the current communication channel aligns with established preferences or represents an unusual deviation that might warrant additional scrutiny. Channel preference scores are calculated as:

$$\text{Channel Preference Score} = (\text{Current Channel Usage Frequency}/\text{Total Communications}) \times \text{Channel Appropriateness Factor},$$

where Channel Appropriateness Factor considers context such as time of day and relationship type.

All trust attributes 902 are generated through privacy-preserving analysis that focuses exclusively on metadata patterns without accessing communication content, ensuring that valuable trust context can be provided while maintaining complete privacy for all entities involved in the communication relationship.

During operation, individual trust attributes 902 generated by these specialized components are integrated with cross-network intelligence correlation results from cross-network intelligence correlator 548 and relationship context validation from interaction graph 520 to generate the overall trust level score. Trust score generator 547 combines the engagement rating, reliability index, temporal patterns, behavioral patterns, and channel preferences with validated cross-pollination patterns and established relationship fingerprints to calculate dynamic trust levels that adapt based on both individual relationship characteristics and collective intelligence from the broader communication ecosystem. This integration ensures that trust level calculations reflect not only the specific relationship dynamics captured by individual attributes but also the broader security insights available through cross-network pattern validation, creating comprehensive trust assessments that leverage both relationship-specific data and ecosystem-wide intelligence while maintaining complete privacy through metadata-only analysis.

Figure 10:
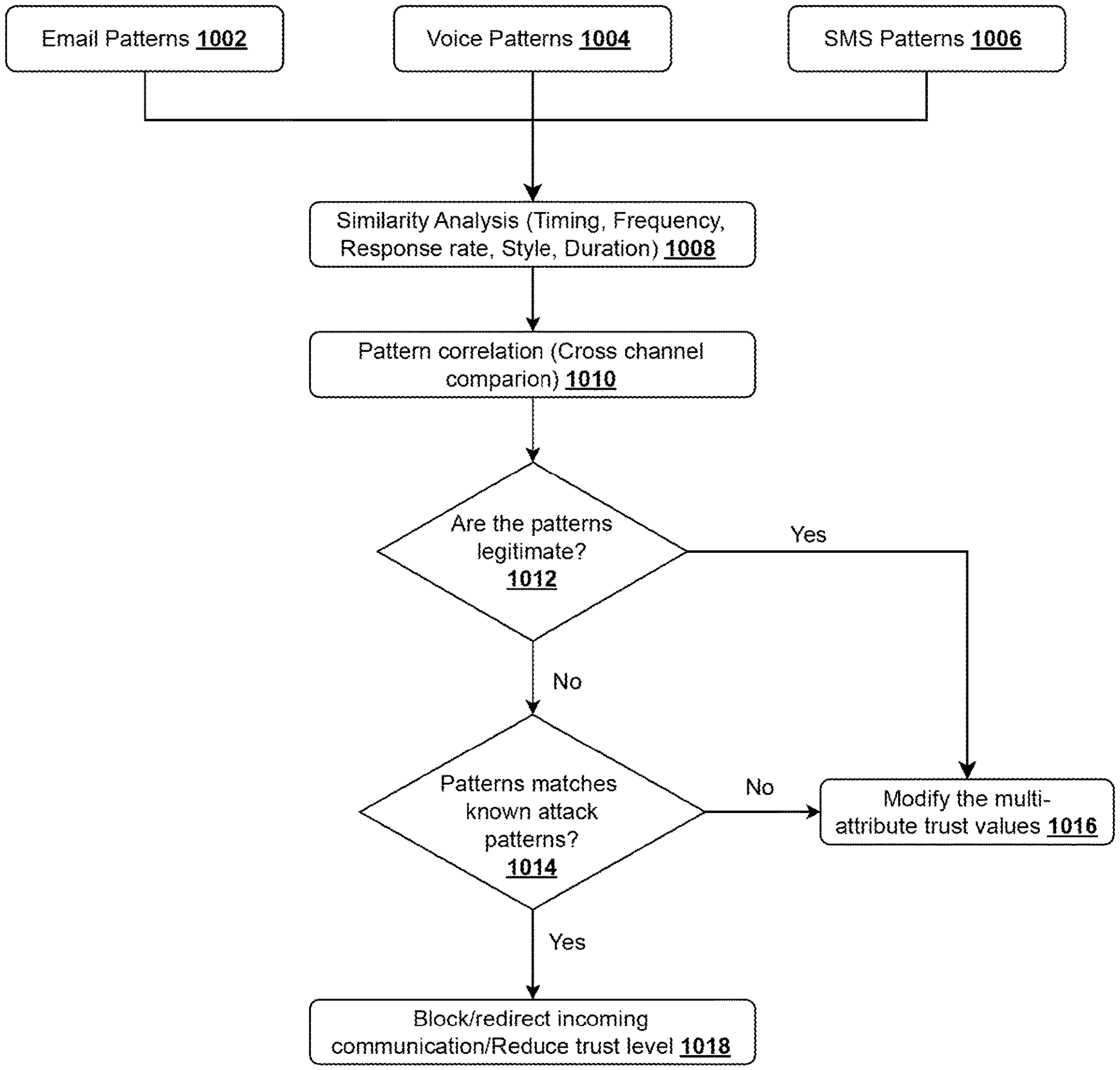
FIG. 10 depicts a flow diagram of an example method for cross-pollination pattern analysis, according to an embodiment of the invention.

FIG. 10 depicts a flow diagram of an example method 1000 for cross-pollination pattern analysis, according to an embodiment of the invention. Cross-pollination pattern analysis enables identification and validation of communication patterns across different services and networks, according to an embodiment of the invention. The steps of method 1000 may be performed by cross-network intelligence correlator 548 in coordination with pattern analysis engine 536 to create a self-strengthening security and trust framework.

Method 1000 begins with parallel analysis of communication patterns across multiple channels. Email patterns 1002, voice patterns 1004, and SMS patterns 1006 may be simultaneously processed by pattern analysis engine 536 to extract channel-specific characteristics while maintaining privacy through metadata-only analysis. Each channel provides unique pattern signatures including temporal characteristics, frequency patterns, interaction styles, and relationship-specific behaviors that contribute to a comprehensive understanding of communication relationships across the entire ecosystem.

At step 1008, cross-network intelligence correlator 548 may perform similarity analysis examining timing, frequency, response rate, style, and duration patterns across the different communication channels. This similarity analysis employs sophisticated algorithms including correlation analysis, pattern matching, and statistical comparison techniques to identify common characteristics that span multiple communication methods. The similarity analysis enables recognition of legitimate multi-channel relationships while detecting inconsistencies that might indicate fraudulent communications attempting to exploit different channels.

The similarity analysis utilizes cosine similarity calculations, Pearson correlation coefficients, and pattern matching algorithms to quantify relationships between patterns across channels. The system calculates a cross-channel similarity score using:

Similarity Score=Σ(Wi×Ci) where Wi represents the weight of channel i and Ci represents the correlation coefficient between channels.

At step 1010, cross-network intelligence correlator 548 may conduct pattern correlation through cross-channel comparison to identify relationships and communication behaviors that exhibit consistency across different services and networks. Pattern correlation analysis validates that observed patterns represent genuine relationship characteristics rather than isolated incidents or potential spoofing attempts. This cross-channel validation significantly strengthens the reliability of trust assessments by leveraging the collective intelligence of the entire communication ecosystem. The correlation analysis uses advanced statistical methods including multivariate regression analysis and machine learning algorithms to identify meaningful pattern relationships.

At step 1012, cross-network intelligence correlator 548 may evaluate whether the identified patterns are legitimate by checking consistency with known relationship behaviors, absence of conflicting indicators, and alignment with expected communication evolution. When patterns are determined to be legitimate, the system proceeds to incorporate these validated patterns into relationship fingerprints and continues normal trust score generation. This validation process ensures that natural relationship evolution and changing communication preferences are appropriately recognized and accommodated. The legitimacy assessment uses a weighted scoring algorithm:

$$\begin{aligned} \textit{LegitimacyScore} = {} & (\text{Consistency Weight} \times \text{Pattern Consistency}) + \\ & (\text{Context Weight} \times \text{Relationship Context}) + \\ & (\text{Deviation Weight} \times (1 - \text{Pattern Deviation})) \end{aligned}$$

At step 1014, the system performs additional analysis to determine whether current patterns match known attack patterns stored in pattern database 538. Cross-network intelligence correlator 548 compares identified patterns against aggregated threat patterns that have been validated across the network using pattern matching algorithms including hash-based comparison, feature vector analysis, and machine learning classification models. The attack pattern matching utilizes a threat signature database that contains abstracted patterns of known malicious communications, enabling proactive identification of emerging threats before they become widespread. When patterns match known attack signatures, the system proceeds to step 1018 to block or redirect the incoming communication, providing immediate protection against recognized threats.

When patterns do not match known attack patterns but also do not qualify as legitimate, the system proceeds to step 1016 to modify multi-attribute trust values, adjusting trust scores to reflect the uncertainty while providing users with appropriate context for making informed decisions.

Cross-network intelligence correlator 548 provides adjustment factors to trust score generator 547 that modify engagement rate scores when cross-channel patterns show inconsistencies, adjust reliability index values when temporal patterns don't correlate across services, and update channel preference scores when communication methods deviate from validated cross-network behaviors. These modifications ensure that trust attributes reflect not only individual relationship characteristics but also collective intelligence from pattern validation across email, voice, and messaging services, creating dynamic trust levels that adapt based on ecosystem-wide security insights while maintaining the privacy-preserving metadata-only approach. This approach ensures that communications falling into uncertain categories receive appropriate handling without completely blocking potentially legitimate communications or providing false confidence in suspicious interactions. The cross-pollination analysis results from method 1000 are provided to trust score generator 547 for trust attribute calculation.

When patterns are determined to be legitimate at step 1012, this validation strengthens individual trust attribute scores, particularly enhancing reliability index, and behavioral pattern scores based on cross-network consistency. When patterns match known attack signatures at step 1014, the system immediately reduces trust level scores and may override other positive attributes to ensure user safety.

Figure 11:
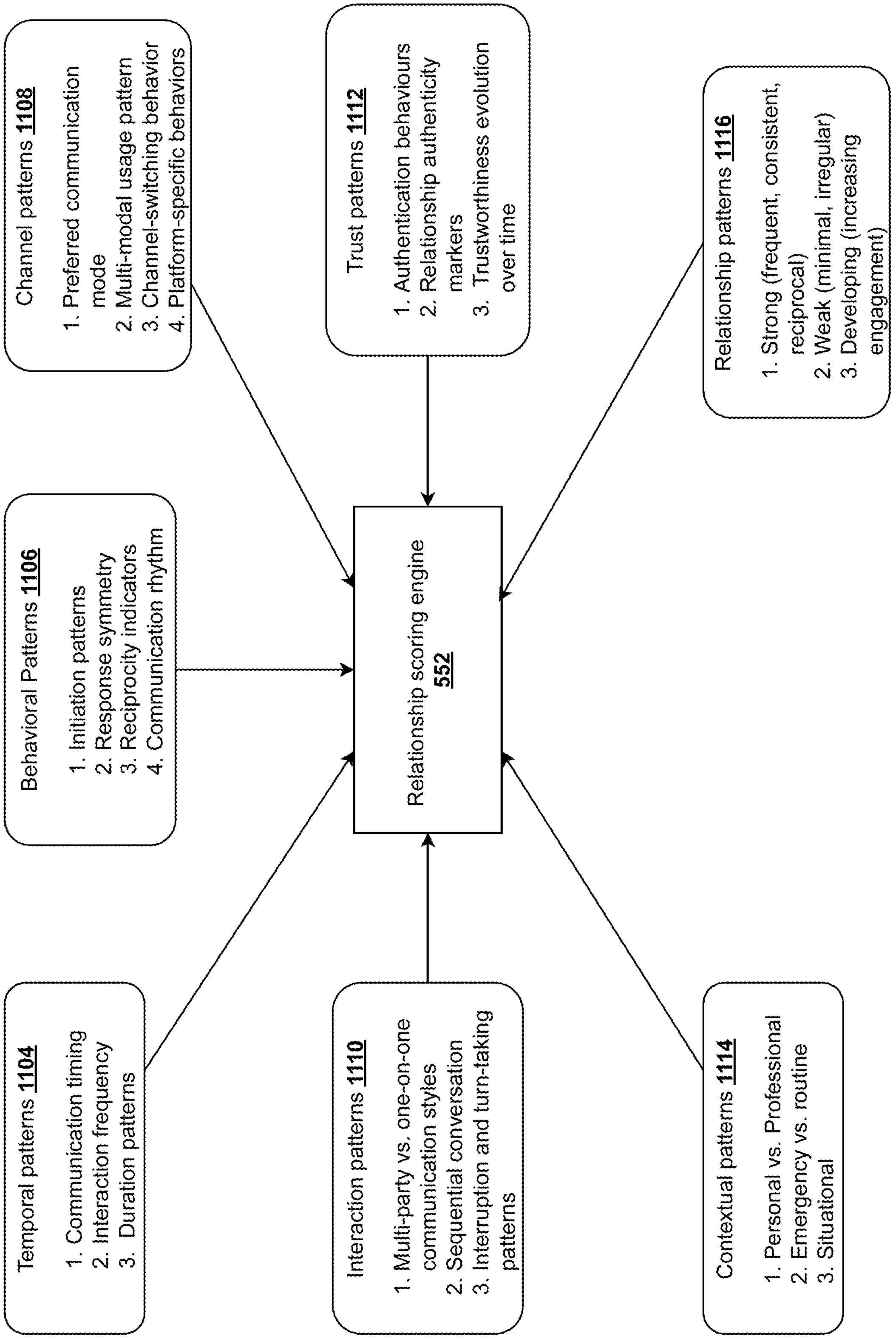
FIG. 11 illustrates the different types of metadata patterns that are used by relationship scoring engine to generate multi-dimensional relationship vectors, according to an embodiment of the invention.

FIG. 11 illustrates the different types of metadata patterns that are used by relationship scoring engine 552 to generate multi-dimensional relationship vectors, according to an embodiment of the invention. FIG. 11 depicts the multiple dimensions of communication metadata patterns that serve as inputs to relationship scoring engine 552.

The pattern categories shown in FIG. 11 represent the diverse metadata signals that relationship scoring engine 552 analyzes to generate the temporal dimensions, behavioral dimensions, communication frequency dimensions, and channel preference dimensions. These patterns are extracted from entity interaction data by pattern analysis engine 536 and processed through the standardization, filtering, vectorization, and preprocessing steps described in FIG. 12 to create the comprehensive multi-dimensional relationship vectors that populate training combination data.

In an embodiment, temporal patterns 1104 may include communication timing preferences, interaction frequency metrics, and duration characteristics that inform temporal and frequency dimensions of the relationship vector. These patterns capture when and how often entities interact without accessing message content.

In an embodiment, behavioral patterns 1106 may include initiation patterns (who starts communications), response symmetry indicators, reciprocity measurements, and communication rhythm analysis. These patterns particularly inform the initiation dimension of the relationship vector while contributing to synchronization measurements.

In an embodiment, channel patterns 1108 may include preferred communication modes, multi-modal usage patterns, channel-switching behaviors, and platform-specific interaction characteristics that directly inform the channel dimension of the relationship vector.

In an embodiment, interaction patterns 1110 may capture communication style preferences including multi-party vs. one-on-one dynamics, sequential conversation management, and turn-taking behaviors. These patterns particularly contribute to the synchronization aspects of relationship scoring.

In an embodiment, trust patterns 1112 may include authentication behaviors, relationship authenticity indicators, and trustworthiness evolution measurements that directly inform the trust dimension of the relationship vector, which typically receives higher weighting in overall relationship strength calculations.

In an embodiment, contextual patterns 1114 may include personal vs. professional context indicators, emergency vs. routine communication signals, and situational adaptation characteristics. These patterns provide critical context for relationship interpretation across different environments.

In an embodiment, communication patterns 1116 measures relationship strength indicators including consistency, reciprocity, engagement level, and relationship lifecycle stage. These patterns help differentiate between strong, developing, and weak relationships.

During operation, relationship scoring engine 552 processes these diverse metadata patterns to generate the multi-dimensional relationship vector. Multi-dimensional relationship may include dimensions that quantify temporal characteristics, frequency metrics, latency measurements, channel preferences, initiation tendencies, synchronization behaviors, and trust indicators. Each dimension may be normalized to a range from 0.0 to 1.0, enabling consistent mathematical processing while preserving complete privacy through metadata-only analysis.

The multi-dimensional representation captures relationship complexities that create training data with epistemic fidelity characteristics including emotional resonance, temporal layering, symbolic richness, and contextual adaptability. FIG. 11 illustrates the metadata pattern diversity that enables relationship scoring engine 552 to generate multi-dimensional relationship vectors, which in turn enable training data generator 550 to create high-quality training combination data through the $N(N-1)/2$ exponential scaling process. The multiple pattern categories ensure that the resulting training data captures the full complexity of entity relationships while maintaining privacy through metadata-only analysis.

Figure 12:
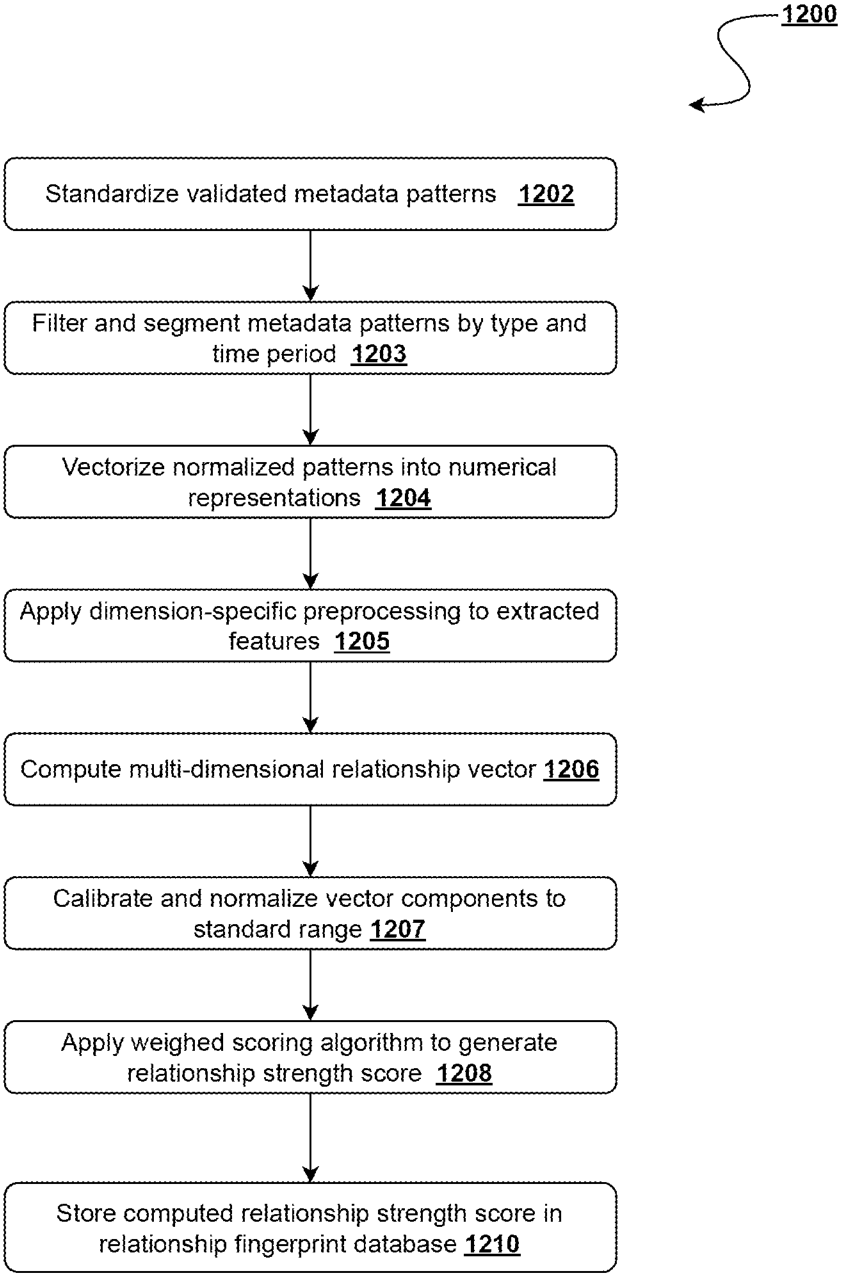
FIG. 12 is a flow diagram of an example method for transformation of the raw metadata patterns into multi-dimensional relationship vectors, according to an embodiment of the invention.

FIG. 12 is a flow diagram of an example method 1200 for transformation of the raw metadata patterns into multi-dimensional relationship vectors, according to an embodiment of the invention. Method 1200 implements the conversion process of validated patterns to multi-dimensional relationship vectors for each entity pair, wherein the multi-dimensional relationship vectors are associated with different dimensions of the metadata patterns. Method 1200 may be executed by processor 511 in coordination with relationship scoring engine 552 by executing instructions stored in memory 512. These instructions, stored in non-transitory computer-readable memory and executed by one or more processors, enable the systematic transformation of raw communication metadata into sophisticated multi-dimensional relationship vectors without accessing communication content.

Relationship scoring engine 552 may coordinate with other system components including pattern analysis engine 536 which supplies validated metadata patterns, and relationship fingerprints database 534 which stores the resulting relationship vectors and strength scores, creating an integrated processing pipeline that serves both communication security functions and exponential training data generation through a unified computational architecture.

Method 1200 depicts the conversion of validated metadata patterns extracted from communication into sophisticated mathematical representations that enable exponential training data scaling. The entire process operates exclusively on metadata without accessing message content, ensuring complete privacy preservation while enabling sophisticated relationship analysis.

At step 1202, relationship scoring engine 552 may standardize validated metadata patterns across different communication contexts and temporal periods. Validated patterns are patterns that have sufficient metadata fields populated for reliable analysis, temporal consistency (communication patterns demonstrate stability over time), and behavioral coherence (identified patterns align with expected relationship characteristics). The validated patterns are metadata patterns that exceed the quality threshold Heterogeneous metadata gets converted to normalized values that can be consistently processed regardless of source. The normalization applies domain-specific scaling factors to communication timing patterns, frequency distributions, response latencies, and behavioral characteristics, ensuring that patterns from different communication channels (voice, email, messaging) are represented in compatible formats. For example, daily email exchanges are normalized differently than weekly voice calls, yet both are converted to comparable measurement scales through statistical normalization techniques.

At step 1203, relationship scoring engine 552 may filter and segment metadata patterns type and organizes them into relevant time periods. Filtering removes noise and statistical anomalies that could distort the multi-dimensional relationship vectors, while segmentation organizes patterns into coherent groups that reveal different aspects of relationship characteristics. This step removes statistical anomalies and outliers that could distort subsequent processing, applying statistical filtering algorithms to identify and exclude non-representative data points. The system segments temporal patterns into appropriate analysis windows (daily, weekly, monthly), enabling time-scale appropriate processing.

Related metadata is grouped by interaction type and channel, creating coherent pattern sets that reveal relationship characteristics across different communication contexts while maintaining complete privacy through metadata-only analysis. Pattern type segmentation organizes patterns into temporal pattern sets capturing all timing-related metadata, behavioral pattern sets capturing all engagement and interaction style metadata, frequency pattern sets capturing all interaction rate and cadence metadata, and channel pattern sets capturing all communication medium preference metadata. This segmentation by type enables dimension-specific processing in subsequent steps, ensuring that temporal features, behavioral features, frequency features, and channel preference features receive appropriate analytical treatment aligned with their specific characteristics.

At step 1204, pattern vectorization may be performed to transform normalized and filtered patterns into numerical representations suitable for mathematical processing. Vectorization creates the numerical feature representations that will populate the multi-dimensional relationship vector. This step extracts specific quantitative features from the standardized and segmented patterns, converting qualitative relationship observations into precise numerical values.

For temporal dimensions, pattern vectorization may extract numerical features including response timing features (average response latency, response time variance, percentage of rapid responses under 1 hour, percentage of delayed responses over 24 hours), interaction timing features (time-of-day distribution vectors, day-of-week distribution vectors, temporal clustering coefficients), duration features (average interaction duration, duration variance, trend in duration over time), consistency features (temporal regularity score, periodicity measures, timing stability coefficients), and evolution features (temporal trend slopes, acceleration indicators, pattern stability measures).

For behavioral dimensions, pattern vectorization may extract numerical features including engagement features (interaction depth scores, engagement persistence measures, attention investment indicators), initiation features (initiation ratio indicating who starts communications, initiation balance coefficient, initiation pattern consistency), reciprocity features (response reciprocity ratio, interaction balance measures, mutual engagement indicators), synchronization features (coordinated behavior coefficients, alignment scores, behavioral matching indicators), and adaptation features (behavioral responsiveness measures, pattern adaptation rates, style matching coefficients).

For communication frequency dimensions, pattern vectorization may extract numerical features including rate features (interactions per day, per week, per month, normalized frequency scores, density distributions), cadence features (regularity of interaction timing, periodicity indicators, rhythm consistency measures), volume features (total interaction counts, cumulative engagement volumes, communication load indicators), trend features (frequency trajectory slopes, acceleration measures, growth or decline indicators), and burst features (communication burst detection, sustained high-frequency period identification, surge pattern indicators).

For channel preference dimensions, pattern vectorization may extract numerical features including usage features (percentage of interactions per channel type, primary channel indicators, channel distribution vectors), diversity features (channel variety scores, multi-channel usage indicators, breadth of channel adoption), switching features (channel transition frequencies, context-specific channel selection patterns, switching consistency measures), preference features (preferred channel rankings, channel comfort indicators, channel avoidance patterns), and evolution features (changes in channel preferences over time, channel adoption or abandonment indicators). The pattern vectorization may implement mathematical algorithms that preserve essential relationship information while creating compact representations that support efficient computation. This step enables the system to perform vector operations including similarity calculations, clustering, and dimensional analysis on relationship data, preparing the foundation for the multi-dimensional vector generation.

The output of pattern vectorization may be a comprehensive feature set for each entity pair, containing multiple numerical features across the dimension categories. These features form the raw material from which the final multi-dimensional relationship vector will be constructed.

This pattern vectorization may apply dimensional reduction techniques to extract the most significant features from complex pattern data, converting qualitative relationship characteristics into precise numerical values. The pattern vectorization may implement mathematical algorithms that preserve essential relationship information while creating compact representations that support efficient computation. This step enables the system to perform vector operations including similarity calculations, clustering, and dimensional analysis on relationship data, preparing the foundation for the multi-dimensional vector generation.

At step 1205, relationship scoring engine 552 may refine the vectorized data by applying dimension specific preprocessing for the extracted feature. Dimension-specific preprocessing recognizes that different types of features require different analytical treatments to maximize their predictive value and reliability. This preprocessing may enhance the quality of features before they are assembled into the final multi-dimensional relationship vector. Different preprocessing techniques may be applied to temporal features, channel features, behavioral features, and trust-related features, enhancing the signal-to-noise ratio for each dimension.

For temporal features, preprocessing may include outlier suppression for abnormal timing events that don't reflect typical patterns, smoothing algorithms to reduce random timing variations while preserving meaningful patterns, normalization to account for time zone differences and business hour variations, and aggregation across multiple time scales to capture both short-term and long-term temporal patterns.

For behavioral features, preprocessing may include consistency validation to ensure behavioral patterns are stable across observation periods, context adjustment to account for situational factors affecting behaviors, reciprocity balancing to properly represent asymmetric but healthy relationships, and engagement calibration to account for different baseline engagement levels across relationship types.

For frequency features, preprocessing may include rate normalization to account for natural frequency variations across channels and contexts, trend extraction to separate underlying frequency patterns from random fluctuations, seasonal adjustment to account for predictable frequency variations (holidays, business cycles), and burst filtering to distinguish meaningful communication surges from anomalous spikes.

For channel features, preprocessing may include availability adjustment to account for which channels are accessible to entities, preference extraction to distinguish chosen channels from default or forced channels, diversity normalization to account for different channel ecosystems across domains, and consistency validation to ensure channel patterns are stable and representative.

The preprocessing validates feature stability across multiple observation periods, ensuring that only consistent, reliable patterns influence the final vector. The system calculates correlation coefficients between different pattern features, identifying interdependencies that inform subsequent weighting decisions and dimensional analysis. The correlation analysis identifies relationships between features that help interpret their combined meaning. For example, high initiation ratio combined with high reciprocity indicates a strong bidirectional relationship despite initiation imbalance, while high frequency combined with low engagement depth might indicate superficial rather than deep relationship engagement.

At step 1206, relationship scoring engine 552 may compute a multi-dimensional relationship vector for each entity pair. The multi-dimensional relationship vector is the one of the outputs of method 1200, representing the complete numerical characterization of a relationship between an entity pair based on metadata patterns. This vector contains all the features extracted, normalized, and refined through the previous steps, organized by dimension categories.

In an embodiment, the multi-dimensional relationship vector comprises multiple dimensions including, but not limited to, temporal dimensions, behavioral dimensions, communication frequency dimensions, and channel preference dimensions capturing communication channel usage patterns.

In various embodiments, the system maintains a hierarchical relationship representation architecture. At a first level, a plurality of individual metadata-derived features are extracted, including timing features, response latency features, initiation ratios, channel usage metrics, and other interaction indicators. These features may number twenty or more depending on implementation.

At a second level, the extracted features are grouped into four primary dimensional categories comprising temporal, behavioral, communication frequency, and channel preference dimensions. These four primary dimensions form the canonical multi-dimensional relationship vector representation.

At a third level, the system may derive additional aggregated or composite summary scores, including trust, engagement, stability, initiation, synchronization, or latency scores, by recombining or weighting the underlying feature set. These derived scores form a secondary summary vector used for computational efficiency in relationship strength scoring and filtering.

Accordingly, the four-dimensional representation and the seven-dimensional summary representation are not alternative architectures but different abstraction levels within a unified relationship modeling framework.

Each dimension category contains multiple features as extracted during vectorization (step 1204) and refined during preprocessing (step 1205). The resulting multi-dimensional relationship vector is a comprehensive numerical representation of the entity pair relationship, containing dozens of features organized across the four primary dimension categories.

In an embodiment, a seven-dimensional summary score vector may be derived from the canonical multi-dimensional relationship vector to provide a compact computational representation of relationship characteristics. This seven-dimensional summary representation is derived by aggregating or recombining underlying feature groups within the canonical multi-dimensional relationship vector and is used for efficient strength scoring, filtering, and comparison operations. Each dimension represents a specific facet of relationship characteristics, with values normalized between 0.0 and 1.0 for consistent processing.

The system measures twenty specific characteristics of the relationship (response latencies, interaction frequencies, channel preferences, initiation patterns, etc.). These twenty measurements are organized into four categories: temporal features (timing-related), behavioral features (engagement-related), frequency features (interaction rate-related), and channel features (communication method-related). Each of the twenty measurements is normalized to a scale of 0.0 to 1.0 so they can be compared fairly despite their different units (seconds, counts per week, percentages, etc.).

The four groups are then combined using weighted averages to create the four primary dimension scores (temporal, behavioral, frequency, channel). For example, temporal score combines all seven timing-related measurements with each given an appropriate weight (response latency gets higher weight than trend slope, for instance). Three additional scores (trust, engagement, stability) are derived by recombining the twenty features in different proportions to highlight specific aspects of the relationship.

For example, a temporal dimension score may quantify timing patterns including communication frequency, time-of-day distributions, and day-of-week patterns by aggregating multiple temporal features into a single 0.0-1.0 score. A temporal score near 1.0 means interactions happen at consistent times with predictable response rates. A score near 0.0 means timing is erratic and unpredictable. The temporal score is indicative of how predictable and reliable the timing of interactions is.

A frequency dimension score may measure interaction rate over time, capturing relationship engagement through quantifiable metrics by aggregating multiple frequency features. A latency dimension score may evaluate response times between communications, revealing relationship dynamics through timing patterns by aggregating multiple response latency features. A frequency score measures how often people interact and whether interaction rates are stable or changing. A high score means consistent regular interactions; a low score means sporadic or rapidly changing interaction patterns.

A behavioral score may measure how balanced and reciprocal a relationship may be. High scores indicate both entities engage equally; low scores indicate one entity dominates interactions.

An engagement score measures how deeply involved and active the relationship is. High scores indicate frequent, detailed interactions; low scores indicate minimal, superficial contact. A stability score measures whether the relationship is mature and established. High scores indicate long-standing, predictable relationships; low scores indicate new or rapidly evolving relationships.

A channel dimension score may assess communication preferences across different methods by aggregating multiple channel usage features. An initiation dimension score measures communication initiation balance between entities by aggregating initiation pattern features. A synchronization dimension score may evaluate coordination patterns including simultaneous activities by aggregating behavioral synchronization features. A channel score measures whether people have preferred communication methods. High scores indicate strong channel preferences and predictable channel selection; low scores mean random channel switching.

A trust dimension score may quantify relationship reliability through pattern consistency by aggregating trust-related features including temporal consistency, behavioral coherence, and interaction reliability indicators. A trust score measures the reliability and consistency of the relationship. This combines several factors like whether people do what they say they'll do and whether patterns remain stable over time.

The relationship between the multi-dimensional relationship vector (with multiple features across dimension categories) and the multi-dimensional score vector is that the individual scores are derived aggregations of the underlying multi-dimensional feature set. The full multi-dimensional relationship vector preserves detailed feature information for use in training data generation, while the multi-dimensional score vector provides a more compact representation useful for relationship strength calculation.

The multi-dimensional score vector (with one aggregated score per dimension) is used when calculating relationship strength scores, as it provides a computationally efficient summary. The system may generate both representations simultaneously, storing the full multi-dimensional relationship vector for training data generation while also computing the seven-dimensional score vector for filtering and strength assessment.

In an embodiment, a seven-dimensional vector may be generated with seven dimensions including temporal, behavioral, frequency, channel, trust, engagement, stability.

At step 1207, relationship scoring engine 552 may perform calibration and normalization of the vector components. This step ensures that all dimensions use consistent value ranges and scaling, applying statistical techniques to standardize each dimension to the 0.0-1.0 range regardless of raw value distributions.

The calibration process adjusts each feature and dimension to account for domain-specific baselines (different domains such as healthcare, finance, education, e-commerce, and social media have different natural patterns, and calibration adjusts features to domain-appropriate scales), relationship type variations (professional relationships, personal relationships, and transactional relationships exhibit different characteristic patterns, and calibration accounts for these differences), temporal context effects (communication patterns vary based on relationship age and maturity, and calibration adjusts for these lifecycle effects), and population-level distributions (features are calibrated against population statistics to ensure scores reflect relative position within expected ranges).

Vector components are calibrated against domain-specific benchmarks derived from established communication patterns, ensuring consistent interpretation across different relationship types and contexts. For example, a response latency of 2 hours might indicate high responsiveness in email-based professional relationships, moderate responsiveness in text messaging contexts, or low responsiveness in real-time chat environments. Calibration ensures this same absolute latency value receives appropriately scaled scores in each context.

Dimensional significance analysis informs subsequent weighting by evaluating the relative importance of each dimension for different relationship categories. This analysis examines which dimensions have highest predictive power for relationship quality in each domain, which dimensions show greatest variance and therefore carry most information, which dimensions are most stable and reliable across observation periods, and how dimensions correlate with each other and with outcome measures. The significance analysis produces domain-specific and relationship-type-specific insights that guide the weighting algorithms applied in the next step. This calibration creates standardized vectors that support mathematical comparison and combination operations in later processing stages including relationship strength score calculation, entity pair qualification, and training combination data generation At step 1208, relationship scoring engine 552 may apply weighted scoring algorithms to generate a multi-dimensional relationship score from the multi-dimensional relationship vector, Mathematical operations may be used to apply different weights to each dimension based on relationship type and application domain.

Typically, temporal and trust dimensions receive higher weights in overall relationship strength calculation, as these dimensions often provide stronger indicators of relationship quality. The weighted scoring implements mathematical formulas that compute a relationship strength score normalized between 0.0 and 1.0, providing a standardized metric for relationship evaluation and qualification. Scores approaching 1.0 indicate strong, reliable, high-quality relationships with consistent patterns across all dimensions. Scores near 0.0 indicate weak, unreliable, or inconsistent relationships. Mid-range scores indicate relationships with moderate strength or mixed characteristics across dimensions.

Further, as different application domains have different characteristics and requirement, the applied weights may vary based on domain. In healthcare, trust and reliability are paramount. Medical decisions depend on consistency and reliability. The system weights trust-related dimensions heavily in healthcare domain calculations.

In finance, responsiveness and predictability matter. Financial markets move quickly, and advisors need to respond rapidly to client inquiries. The system weights temporal (response time) dimensions heavily.

In education, engagement and participation matter most. Learning effectiveness depends on active participation. The system weights engagement dimensions heavily.

In e-commerce, frequency and channel consistency matter. Customers value regular promotions and multiple purchase options. The system weights frequency dimensions heavily.

In social media, frequency and engagement dominance. These platforms thrive on high interaction frequencies and visible engagement. The system weights frequency and engagement heavily. Domain-specific weighting ensures the system appropriately reflects what matters in each context.

The relationship strength score provides a single numerical measure that quantifies the overall quality and reliability of the entity relationship based on the comprehensive analysis of all metadata patterns. The bidirectional relationship between entities is evaluated by combining vector scores from both directions, analyzing reciprocity, balance, and mutual engagement patterns. Bidirectional evaluation recognizes that relationships may be asymmetric, where entity A has different interaction patterns toward entity B than B has toward A. The system examines reciprocity (do both entities engage similarly?), initiation balance (is communication initiated relatively equally?), response symmetry (do both entities respond with similar latency and engagement?), and mutual consistency (are patterns stable from both perspectives?). The bidirectional analysis may adjust relationship strength scores to account for healthy asymmetric relationships (such as student-teacher or patient-provider relationships where asymmetry is expected) versus unhealthy asymmetric relationships (where one entity is highly engaged but the other is not, indicating weak relationship quality).

The strength calculation incorporates temporal evolution analysis to identify developing versus established relationships by examining how patterns change over time. Developing relationships show increasing engagement, strengthening patterns, and evolving characteristics, while established relationships demonstrate stable, mature patterns. The relationship strength score may be adjusted based on relationship maturity, with established relationships receiving higher confidence than newly developing relationships with limited history.

The system applies mathematical functions that generate strength scores for each entity pair. Relationship scoring engine 552 determines which entity pairs qualify for subsequent combination generation in the training data production process. Entity pairs with relationship strength scores exceeding the predetermined threshold (typically 0.5-0.7, but configurable) become qualified entity pairs that proceed to training combination data generation as described in FIG. 13. Entity pairs with scores below the threshold are filtered out, ensuring that only high-quality relationships generate training data.

Determining entity pairs for combination generation is described in steps 1311-1318, where qualified entity pairs are used to generate N(N−1)/2 training combination data.

At step 1210, the computed relationship strength scores may be stored in relationship fingerprints database 534 for subsequent processing and retrieval. Fingerprints database 534 may maintain the complete set of multi-dimensional relationship vectors along with their computed strength scores, creating a persistent repository of relationship representations that supports both communication security functions and training data generation.

The database stores for each entity pair: the complete multi-dimensional relationship vector with all features across all dimension categories (temporal, behavioral, frequency, channel), a multi-dimensional summary score vector (if computed), the relationship strength score, entity identifiers for the pair, temporal context including when the vectors were computed and the time period they represent, domain identifier indicating the source domain (healthcare, financial services, education, e-commerce, or social media, relationship label indicating the relationship classification (if available), quality metadata including pattern confidence scores and feature stability indicators.

The storage implementation includes efficient indexing structures that enable rapid retrieval based on entity identifiers, relationship characteristics, or strength thresholds. Indexing enables quick lookup of all relationships for a specific entity, filtering of entity pairs by relationship strength threshold for training data generation, retrieval of relationships matching specific characteristic patterns, temporal queries to access relationship states at different time points, and domain-specific queries to access relationships from particular application. Application domain (or simply domain) refers to an specific industry or context in which the communication management system operates.

The stored multi-dimensional relationship vectors serve as the foundation for training combination data generation. When method 1200 completes for all entity pairs in a population, and relationship fingerprints database 534 contains the complete set of relationship vectors N(N−1)/2 training combinations may be generated as described in FIG. 13.

Method 1200 thus implements the critical conversion of the validated patterns to multi-dimensional relationship vectors for each entity pair, Raw metadata patterns are transformed into structured, normalized, multi-dimensional numerical representations that capture temporal, behavioral, frequency, and channel characteristics of entity relationships. These vectors enable both relationship strength scoring (for qualification filtering) and exponential training data generation (by providing the rich feature representations that populate training combinations).

The privacy-preserving nature of method 1200 is maintained throughout, as all processing operates exclusively on metadata without accessing communication content, ensuring compliance with privacy regulations while enabling sophisticated relationship analysis and training data generation.

Method 1200 transforms raw metadata patterns into multi-dimensional relationship vectors, producing standardized dimensional representations (temporal, behavioral, frequency, channel dimensions) for each discovered pattern. Method 1300 (FIG. 13) accepts these vectors and generates exponential training data multiplication within single domains. The dimensional standardization performed in FIG. 12 enables FIG. 13 to apply consistent pattern generation algorithms regardless of metadata source domain.

Figure 13:
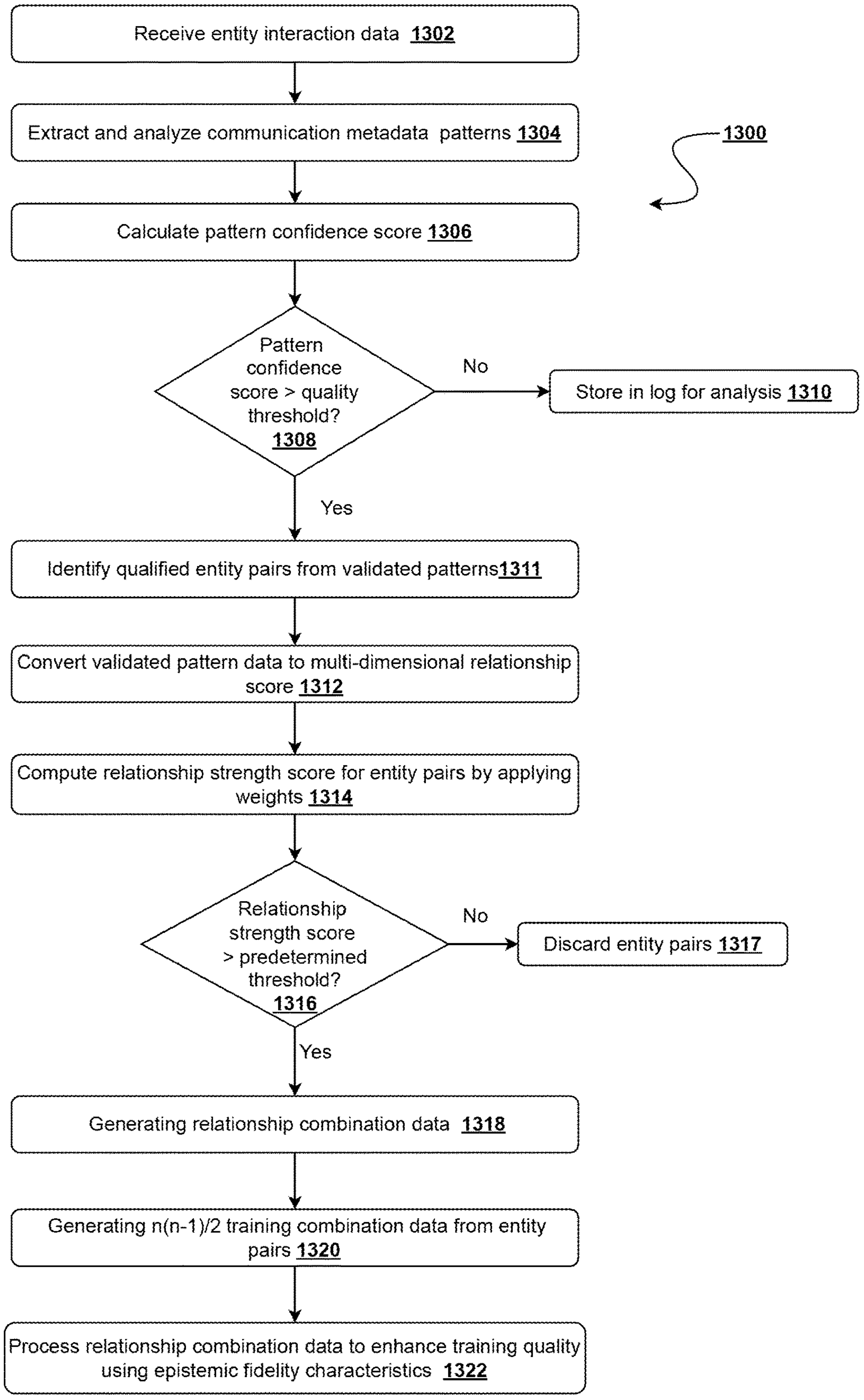
FIG. 13 is a flow diagram of an example method for exponential training data generation, according to an embodiment of the invention.

FIG. 13 is a flow diagram of an example method 1300 for exponential training data generation, according to an embodiment of the invention. Method 1300 may be executed by processor 511 in coordination with different components of the communication management server 506 by executing instructions stored in memory 512. These instructions, stored in non-transitory computer-readable memory and executed by one or more processors, enable the exponential training data generation process 1300 that transforms N entities into N(N−1)/2 training data combinations through relationship-based processing.

At step 1302, method 1300 begins with receiving entity interaction data from a plurality of entities across multiple communication channels. The system receives entity interaction data that includes communications between entities operating in healthcare, financial services, education, e-commerce, and social media domains. Entity interaction data encompasses all forms of digital communications including emails, text messages, voice calls, video conferences, instant messages, and social media interactions that occur between entities through the communication management system. The system captures interaction data without accessing communication content, focusing exclusively on metadata patterns that preserve privacy while enabling relationship analysis.

At step 1304, pattern analysis engine 536 may extract and analyze metadata from the entity interaction data. Pattern analysis engine 536 may identify timing patterns, frequency distributions, response latencies, and behavioral characteristics without accessing communication content. Pattern identification utilizes machine learning algorithms, statistical analysis, and behavioral modeling techniques to extract meaningful relationship insights from communication metadata.

Pattern analysis engine 536 may analyze the extracted metadata to discover underlying relationship patterns, communication behaviors, temporal trends, and interaction characteristics that define entity relationships. The extracted metadata patterns may include, but is not limited to, temporal patterns, behavioral patterns, frequency patterns, and channel patterns.

Temporal patterns my capture timing patterns including temporal sequences of communications, peak interaction periods, communication duration patterns, and seasonal or cyclical interaction behaviors, response timing patterns indicating communication urgency and priority and time-of-day preferences showing contextual communication habits.

Behavioral patterns capture entity interaction characteristics including, but not limited to, communication initiation patterns (which entity typically initiates contact), reciprocity patterns (measuring balanced versus one-sided interactions), engagement depth patterns (level of interaction complexity), interaction consistency (relationship stability), behavioral synchronization indicators (coordinated communication behaviors), and communication style patterns (formality, urgency, and interaction modes).

Frequency patterns capture interaction rate characteristics including, but not limited to, communication frequency rates measuring contacts per time period, interaction consistency measures showing regularity of contact, communication volume patterns revealing relationship intensity, and cadence patterns showing rhythmic interaction patterns, trend patterns indicating increasing, stable, or decreasing interaction rates, and burst patterns revealing concentrated communication periods.

Channel patterns capture communication medium preferences including, but not limited to, preferred communication channels (email, voice, text, video) for different contexts, channel switching patterns (multi-modal communication behaviors), channel diversity, context-specific channel selection (revealing situational preferences), and channel consistency patterns.

Pattern analysis engine 536 may ensure privacy preservation through metadata-only processing. Pattern analysis engine 536 does not access message content or body text, email subject lines or content, voice call transcriptions, document contents, or image or video content. Pattern analysis engine 536 may process timestamps to identify different patterns.

For example, metadata patterns may be identified using timestamps (For example, UNIX epoch times), duration (in seconds), frequency (events per time unit), channel identifiers (For example, 1=email, 2=phone, 3=SMS), response latency (time between receipt and response), and interaction sequences (For example, A→B→A communications).

This metadata-only approach ensures compliance with regulation set by General Data Protection Regulation (GDPR) and California Consumer Privacy Act (CCPA) while generating rich training data.

In an embodiment, pattern analysis engine 536 may identify seven-dimensional relationship patterns including temporal patterns that capture timing and scheduling behaviors, frequency patterns that measure communication consistency, latency patterns that analyze response behaviors, channel patterns that determine communication preferences, initiation patterns that identify communication leadership roles, synchronization patterns that measure behavioral alignment, and trust patterns that assess relationship reliability and consistency. These seven-dimensional patterns form the basis for subsequent multi-dimensional relationship vector generation, where each dimension contributes to the comprehensive representation of entity relationships. It must be understood that the seven-dimensions relationship pattern is an example, any number of relationships patterns may be considered.

At step 1306, for each individual patterns score, processor 511 may compute a pattern confidence score to quantify the reliability and statistical significance of the identified patterns. Pattern confidence scoring assesses data completeness by verifying that sufficient metadata fields are populated for reliable analysis. Pattern confidence scoring assessment considers temporal consistency (communication patterns demonstrate stability over time) and behavioral coherence (identified patterns align with expected relationship characteristics)

In an embodiment, a multi-factor evaluation may be implemented based on data completeness, temporal consistency, and behavioral coherence. These three factors are computed and combined to determine a confidence score for each individual pattern.

Data completeness is an assessment of whether sufficient metadata exists to establish the specific pattern as statistically significant, considering factors such as the number of observations and pattern repetitions. Patterns with broader evidence and multiple instances receive higher completeness scores. Data completeness evaluation examines metadata field population rates, minimum observation thresholds, pattern repetition counts, and temporal coverage spans to ensure statistical validity. In an embodiment, data completeness (DC) may be calculated as below:

$$DC = (0.4 \times MetadataFieldRatio) + (0.35 \times ObservaionRatio) + (0.25 \times RepetitionRatio)$$

Where MetadataFieldRatio=populated_fields/5 (capped at 1.0) and the five required fields: [timestamp, channel_type, duration, sender_id, receiver_id], ObservationRatio=min(1.0, observation_count/5)[Pattern requires minimum 5 observations], and RepetitionRatio=min (1.0, repetition_count/3)[Pattern must repeat minimum 3 times]

Result: DC ranges from 0.0 to 1.0

Temporal consistency measures whether the specific pattern remains stable across different observation periods. Pattern analysis engine 536 may analyze how consistently the pattern appears over time, with stable patterns receiving higher consistency scores than those showing high variability. Temporal consistency analysis evaluates pattern stability across multiple time windows, variance in pattern characteristics over time, deviation from expected temporal distributions, and consistency of pattern appearance across different contexts. In an embodiment, temporal consistency (TC) may be calculated using the formula below:

$$TC = 1.0 - \min(1.0,\ \text{Standard\_Deviation/Mean})$$

Where the measurements are all individual pattern occurrences, Mean is the average of all measurements, and $$\text{Standard\_Deviation} = sqrt\left(\sum((\text{x\_i} - \text{Mean})^2)/\text{count}\right)$$

Consider an example: Response times [60, 65, 58, 62, 61] minutes $$\text{Mean} = 61,\ StdDev = 2.32,\ TC = 1.0 - (2.32/61) = 0.962$$

Result: TC ranges from 0.0 (highly variable) to 1.0 (perfectly consistent)

Behavioral coherence determines whether the pattern demonstrates characteristics that align logically with expected relationship dynamics for its category. Patterns showing coherent, contextually appropriate behaviors receive higher coherence scores. Behavioral coherence assessment validates that patterns align with known relationship models, conform to domain-specific behavioral expectations, demonstrate logical consistency with related patterns, and exhibit characteristics appropriate for the relationship context. In an embodiment behavioral coherence (BC) may be computed using below formula:

$$BC = \text{Pearson\_Correlation}(PredictedBehavior, ActualBehavior)$$

Where ActualBehavior is the observed patterns from entity interaction data, PredictedBehavior is the expected behavior from similar relationships in database, and where the correlation uses standard Pearson formula.

$$\text{If correlation} < 0, \text{ set } BC = 0.0 \text{ (reject negative correlations)}$$

Result: BC ranges from 0.0 to 1.0

These three evaluation components may be combined using weighted algorithms to generate a confidence score for each individual pattern, normalized to a 0.0-1.0 scale. The weighting adjusts based on pattern type and relationship context. For example, temporal consistency might receive higher weighting for professional relationship patterns, while behavioral coherence might be weighted more heavily for personal relationship patterns. In an example, $$\text{Pattern\_Confidence\_Score} = (0.40 \times DC) + (0.35 \times TC) + (0.25 \times BC)$$

$$\text{Quality Threshold: } PCS \geq 0.70$$

$$\text{Patterns scoring} \geq 0.70 \text{ proceed to entity pair identification}$$

$$\text{Patterns scoring} < 0.70 \text{ are logged for analysis and discarded}$$

The domain-specific weight adjustments may be as below:

$$\text{Healthcare: } w1 = 0.30,\ w2 = 0.30,\ w3 = 0.40 \text{ (emphasize behavioral coherence)}$$

$$\text{Finance: } w1 = 0.35,\ w2 = 0.45,\ w3 = 0.20 \text{ (emphasize temporal consistency)}$$

$$\text{Education: } w1 = 0.45,\ w2 = 0.30,\ w3 = 0.25 \text{ (emphasize data completeness)}$$

$$E\text{-commerce: } w1 = 0.40,\ w2 = 0.35,\ w3 = 0.25 \text{ (balanced)}$$

$$\text{Social media: } w1 = 0.30,\ w2 = 0.50,\ w3 = 0.20 \text{ (emphasize temporal consistency)}$$

When a domain identifier matches domain-specific configuration then domain-specific weights are applied and when the domain identifier does not match the domain-specific configuration universal default weights (0.40, 0.35, 0.25) are applied.

At step 1308, pattern analysis engine 536 may determine whether the pattern confidence score exceeds a quality threshold. In an embodiment, the quality threshold may be user configurable and may be set between 0.6 and 0.9 depending on application requirements. Higher quality thresholds (0.8-0.9) may be used for critical applications requiring maximum reliability, while lower thresholds (0.6-0.7) may enable broader pattern inclusion for exploratory analysis or data-rich environments where pattern volume compensates for individual pattern uncertainty.

At step 1308, when the pattern confidence score falls below the quality threshold, method 1300 proceeds to step 1310 where the pattern data may be stored in a log for analysis. Low-confidence patterns are logged for system improvement, pattern analysis refinement, and threshold optimization. This logging process enables continuous improvement of pattern recognition algorithms and helps identify communication scenarios that require enhanced metadata processing capabilities.

At step 1308, when the pattern confidence score meets or exceeds the quality threshold, then at step 1311, pattern analysis engine 536 may identify qualified entity pairs from validated patterns that exceed the quality threshold. The validated patterns are metadata patterns that exceed the quality threshold at step 1308. This step associates validated metadata patterns with specific entity pairs that generated these patterns through their interactions. Pattern analysis engine 536 may determine which entities are connected by each validated pattern and groups related patterns by entity pairs to create a relationship context for each pair.

This entity pair identification process creates the foundation for relationship scoring by establishing which specific entities will receive multi-dimensional relationship vectors. The identification process ensures that each entity pair represents a distinct relationship with sufficient validated pattern evidence to support meaningful relationship scoring. Entity pairs are formed based on communication metadata that shows interaction between the entities, creating explicit relationship candidates that proceed to the scoring process. This step transforms pattern-level validation into entity-pair-level processing, establishing the relationship units that will receive scoring, strength evaluation, and eventual combination generation.

At step 1312, relationship scoring engine 552 may convert validated patterns to multi-dimensional relationship vector. The conversion process transforms validated metadata patterns into multi-dimensional relationship vectors through a structured methodology that extracts features from patterns, normalizes them across communication contexts, and organizes them into dimensional categories.

The conversion process transforms validated metadata patterns into multi-dimensional numerical affinity scores through relationship scoring methodology. Each entity pair receives a multi-dimensional relationship vector comprising temporal score (0.0-1.0), frequency score (0.0-1.0), latency score (0.0-1.0), channel score (0.0-1.0), initiation score (0.0-1.0), synchronization score (0.0-1.0), and trust score (0.0-1.0). The process of conversion of the validated patterns into a multi-dimensional relationship score has been discussed in previous FIG. 12.

At step 1314, relationship scoring engine 552 may compute relationship strength score for entity pairs by applying weights to each dimension of the multi-dimensional relationship vector. The relationship strength score is indicative of the quality and reliability of entity relationships. Domain-specific weights may be applied to multiple dimensions and the multiple dimensions may be combined into a single aggregate score. The weighting process recognizes that different dimensions have varying predictive power for relationship quality across different application domains.

In one implementation, the relationship strength computation calculates a weighted average of the seven-dimensional numerical affinity scores, applying domain-specific weighting algorithms that emphasize the most predictive relationship dimensions for each application context. Relationship strength scoring enables the system to quantify the overall quality and reliability of entity relationships through a single metric that combines multiple relationship dimensions. The relationship strength score is calculated using the seven intermediate dimension scores:

$$Relationship\_Strength=w_1\times temporal\_score+w_2\times frequency\_score+w_3\times channel\_score+w_4\times initiation\_score+w_5\times synchronization\_score+w_6\times trust\_score+w_7\times engagement\_score$$

where weights $w_1$ through $w_7$ sum to 1.0 and are adjusted based on the application domain.

In certain embodiments, a latency score may be derived as a subcomponent of the temporal dimension and optionally exposed as a separate summary score for computational weighting purposes. However, latency is computed from temporal interaction characteristics and does not constitute an independent primary dimension.

In an embodiment, the computed relationship strength scores may range from 0.0 to 1.0, where higher scores indicate stronger, more reliable relationships that generate higher-quality training data for artificial intelligence systems. In an example embodiment, trust and temporal dimensions may typically receive weights (example, 0.3 and 0.25 respectively), while other dimensions receive distributed weights. These weights are configurable and can be adapted based on domain requirements, with healthcare applications potentially emphasizing trust dimensions more heavily (example, weights up to 0.4), while e-commerce applications might emphasize frequency and recency dimensions more strongly The computed relationship strength scores may be stored in relationship fingerprints database 534 for subsequent processing and retrieval. Fingerprints database 534 may maintain the complete set of multi-dimensional vectors along with their computed strength scores, creating a persistent repository of relationship representations that supports both communication security functions and training data generation.

At step 1316, relationship scoring engine 552 may determine whether the relationship strength score exceeds a predetermined threshold. The relationship strength threshold validation step ensures that only meaningful, reliable relationships proceed to combination generation, filtering out weak or inconsistent entity interactions that would produce low-quality training data. In an example, the predetermined threshold may be set (example, 0.5) for most applications but may be configurable based on domain requirements and quality standards. Higher thresholds (example, 0.6-0.8) are used when training data quality is prioritized over volume, while lower thresholds (example, 0.4-0.5) enable larger training datasets when volume is needed and downstream filtering is available.

At step 1316, when the relationship strength score falls below the predetermined threshold, method 1300 proceeds to step 1317 where the entity pairs that do not meet strength requirements are discarded. Discarded entity pairs are excluded from training data generation to maintain overall data quality and computational efficiency. This filtering process prevents weak relationships from diluting training data quality and reduces computational load by processing only qualified entity pairs.

At step 1316, when the relationship strength score meets or exceeds the predetermined threshold, method 1300 proceeds to step 1318 where training data generator 550 may generate relationship combination data from qualifies entity pairs. The qualified entity pairs are entity pairs with the relationship strength score exceeding the predetermined threshold. The combination generation process creates all possible unique entity pairs from qualified entities while avoiding duplicate pairs and self-references. Each entity pair is associated with its corresponding multi-dimensional relationship vector and relationship strength score from the previous processing steps.

The combination generation process creates all possible unique entity pairs from qualified entities while avoiding duplicate pairs and self-references. Each entity pair is associated with its corresponding multi-dimensional relationship vectors and relationship strength score from the previous processing steps. The relationship combination data comprises a collection of qualified entity pairs, and each entry includes the entity identifiers, the complete multi-dimensional relationship vector with all its features across all dimensions, the computed relationship strength score, and contextual metadata about the relationship source and characteristics.

In the context of exponential training combination generation, N refers to the number of qualified entities identified after relationship strength threshold filtering. The $N(N-1)/2$ expression represents the number of unique unordered entity pairs that may be formed from the set of N qualified entities, excluding self-pairs and duplicate reversed pairs. At step 1320, training data generator 550 uses scaler 555 to generate $N(N-1)/2$ training combination data from entity pairs. Each training combination data includes a multi-dimensional vector, a relationship label and a domain identifier. The training combination data generation process implements the core exponential scaling mechanism using scaler 555 to transform N qualified entity pairs into $N(N-1)/2$ unique training combinations. This mathematical transformation provides the exponential growth in training data that addresses the AI industry's training data scarcity problem.

In an embodiment, training data generator 550 may use specific algorithm for transforming N entities into $N(N-1)/2$ training combinations. First, training data generator 550 may create unique entity pairs from the qualified entities. For N qualified entities, the system generates all possible unique pairs where each entity is paired with every other entity exactly once, avoiding duplicate pairs (e.g., treating (E1, E2) and (E2, E1) as the same pair) and self-pairs (e.g., excluding (E1, E1)). This creates exactly $N(N-1)/2$ unique entity pair combinations.

Second, for each unique entity pair, the system may combine the multi-dimensional relationship vector with additional training-relevant information to form a complete training combination. The additional information may include a relationship label and a domain identified. Each training combination data has an associated multi-dimensional relationship vector with multiple dimensions including temporal dimensions, response latency patterns, interaction duration patterns; behavioral dimensions, initiation patterns, reciprocity patterns, communication frequency dimensions, cadence patterns, and channel preference.

In an embodiment, the relationship label provides a relationship classification between the entity pair. The relationship label indicates the type or category of relationship, which may include classifications such as professional, personal, familial, transactional, collaborative, or domain-specific relationship types. Relationship labels enable supervised learning by providing ground truth or inferred relationship categories that AI systems can learn to predict or utilize in decision-making.

In an embodiment, the domain identifier specifies the source application domain from which the entity interaction data originated. The domain identifier indicates whether the relationship data came from healthcare, financial services, education, e-commerce, social media, or other application domains. Domain identifiers enable cross-domain learning by allowing AI systems to identify patterns that generalize across domains versus those that are domain-specific System generates N(N−1)/2 training combinations by repeating this process for all unique entity pairs. Each training combination is formatted as an AI-ready training dataset with feature vectors, target labels, and associated metadata.

Relationship combination generation implements the mathematical foundation of exponential scaling, where n qualified entities generate N(N−1)/2 unique relationship combinations. In an embodiment, training data generator 550 may use specific algorithm for transforming N entities into N(N−1)/2 training combinations as follows:

During entity metadata extraction, for each entity Ei (where i=1 to N), metadata extraction is performed. The steps of metadata extraction include:

(Extract temporal metadata: {timestamp, frequency, duration}

Extract behavioral metadata: {initiation_rate, response_time, interaction_count}

Extract channel metadata: {preferred_channel, channel_switch_count}

Store as vector Vi=[t1, t2, . . . , b1, b2, . . . , c1, c2, . . . ])

This entity-level vector Vi represents the metadata characteristics of entity Ei derived from all its interactions. Each element in Vi corresponds to a specific metadata feature, organized by dimension categories (temporal, behavioral, channel). Once the metadata is extracted a pairwise relationship generation (relationship combination data) is performed. For each unique pair (Ei, Ej) where i<j, relationship vector is calculated and transformation function is applied.

Rij=Vi⊗Vj (element-wise operations), and

Tij=σ(w·Rij+b)

where Rij is the pairwise relationship vector combining features from both entities, -Vi⊗Vj represents element-wise operations (such as concatenation, difference, product, or learned combinations) that create relationship features from individual entity features, Tij is the transformed relationship representation, W is a learned weight matrix that maps relationship features to optimized representations, -b is a bias term, -σ is an activation function (such as ReLU, tanh, or sigmoid) that introduces non-linearity, W is a learned weight matrix, b is bias, σ is activation.

Training data is computed from the pairwise relationship combination data. For each pairwise relationship (Rij), feature vectors (F) and label (L) are generated to form the training instance (F, L)

F=[Rij, domain_label, timestamp]

L=relationship_strength_score

Training instance: (F, L)

where: -F is the complete feature vector for the training combination, comprising the multi-dimensional relationship vector Rij (with multiple dimensions), the relationship label (domain_label indicating the relationship classification), and the domain identifier (indicating source domain), along with temporal context (timestamp), L is the target label, which in this example uses the relationship strength score as the learning target, though other labels could be used depending on the AI system's learning objective, training combination (F, L) represents one complete training data point ready for consumption by AI systems.

Consider an example with N=10 entities with four entities E1, E2, E3, E4, E5, E6, E7, E8, E9, E10. Relationship pairs (relationship combination data) generated:

(E1,E2), (E1,E3), (E1,E4), (E1,E5), (E1,E6), (E1,E7), (E1,E8), (E1,E9), (E1,E10) (E2,E3), (E2,E4), (E2,E5), (E2,E6), (E2,E7), (E2,E8), (E2,E9), (E2,E10) (E3,E4), (E3,E5), (E3,E6), (E3,E7), (E3,E8), (E3,E9), (E3,E10) (E4,E5), (E4,E6), (E4,E7), (E4,E8), (E4,E9), (E4,E10) (E5,E6), (E5,E7), (E5,E8), (E5,E9), (E5,E10) (E6,E7), (E6,E8), (E6,E9), (E6,E10) (E7,E8), (E7,E9), (E7,E10) (E8,E9), (E8,E10) (E9,E10)

Total: 10(10−1)/2=45 training points

In comparison to traditional training data approach where ten relationship pairs generate ten data points, training data generator 550 creates forty-five training points. This is an exponential increase in the number of training points. Each training combination data includes a multi-dimensional vector with multiple dimensions, relationship label and domain identifier.

Consider the use case of a personalized patient communication AI with 550 entities. The number of training points is:

Training points: N(N−1)/2=550(549)/2=151,425 Training Points

In another example, 1,000 qualified entities generate 499,500 relationship combinations, compared to 1,000 individual training data points in traditional linear approaches. This exponential scaling provides orders of magnitude more training data from the same entity population, addressing training data scarcity while maintaining data quality through relationship-based processing.

The N(N−1)/2 training combination generation produces exponentially more training data points than traditional approaches, enabling AI systems to learn from communication patterns rather than individual entity characteristics. Training data includes all necessary information for artificial intelligence systems to learn relationship intelligence, pattern recognition, and cross-domain compatibility through relationship-based processing methodologies.

At step 1322, fidelity enhancer 556 may enhance training quality using epistemic fidelity characteristics. The fidelity enhancement process applies four distinct fidelity characteristics to the training combination data, transforming basic relationship vectors into training data with optimal epistemic fidelity for AI learning. Each fidelity characteristic enhances specific aspects of the training data to create representations that enable sophisticated AI learning outcome. Fidelity characteristics may include quantifiable data quality metrics including, but not limited to temporal fidelity, behavioral coherence, symbolic representation score, and contextual adaptation matrix.

In an embodiment, fidelity enhancer 556 may analyze temporal evolution patterns within relationship combinations to create temporally layered information that captures how relationships develop and change over time. Temporal layering creates multi-scale temporal representations that capture how relationships develop and change across different time horizons. This fidelity characteristic recognizes that relationships exhibit different characteristics when viewed at different temporal scales, with short-term patterns revealing immediate interaction dynamics, medium-term patterns showing relationship evolution, and long-term patterns demonstrating sustained relationship characteristics. In an example, temporal fidelity (TF) may be computed using below formula:

$$TF = \sum(\text{consistent\_patterns})/\sum(\text{total\_patterns})$$

where consistent patterns have minimal variance. This metric quantifies the temporal stability and consistency of patterns across different time scales, with higher TF values indicating more reliable temporal patterns in the training data Temporal layering creates multi-scale temporal representations that capture how relationships develop and change across different time horizons. This fidelity characteristic recognizes that relationships exhibit different characteristics when viewed at different temporal scales, with short-term patterns revealing immediate interaction dynamics, medium-term patterns showing relationship evolution, and long-term patterns demonstrating sustained relationship characteristics In an embodiment, fidelity enhancer 556 may extract emotional resonance indicators from behavioral patterns and trust scores to identify relationship characteristics that provide optimal learning value for artificial intelligence systems. Emotional resonance enhancement creates training data that captures the affective and qualitative aspects of relationships revealed through behavioral patterns. While the system processes only metadata without accessing content, behavioral patterns such as response timing, communication frequency variations, and interaction engagement reveal emotional dimensions of relationships.

The emotional resonance enhancement incorporates these sentiment indicators, emotional valence scores, and affective communication pattern representations into the training data, creating emotionally resonant representations that achieve temporal correlation between emotional patterns (inferred from metadata) and communication behaviors. A high correlation ensures that the training data captures the relationship between emotional states and observable communication patterns, enabling AI systems to understand and predict emotionally-informed behaviors In an example, a Behavioral Coherence (BC) may be computed using below formula:

BC=correlation_coefficient(predicted_behavior, actual_behavior)

A high correlation coefficient is indicative of high fidelity.

In an embodiment, fidelity enhancer 556 may generate symbolic richness through contextual pattern analysis across multiple communication channels, enabling AI systems to understand relationship nuances and contextual variations. Symbolic richness enhancement extracts abstract, semantic representations from the concrete metadata patterns, creating training data that contains rich symbolic features enabling sophisticated pattern recognition. While metadata patterns provide numerical values, symbolic richness transforms these into higher-level semantic features that capture the meaning and context of communication patterns.

A symbolic representation score (SRS) may be generated using pre-trained embeddings from BERT/Word2Vec.

SRS=embedding_similarity(metadata_vector,semantic_space)

The generation of epistemic fidelity characteristics ensure that training data is emotionally resonant, temporally layered, symbolically rich, and contextually adaptive, providing artificial intelligence systems with training data that captures the depth and complexity necessary for advanced learning outcomes. Enhanced training data through epistemic fidelity processing enables AI systems to develop more sophisticated understanding of communication patterns and contextual intelligence.

In an embodiment, fidelity enhancer 556 may apply contextual adaptivity by incorporating environmental factors, situational relationship contexts, and domain-specific relationship characteristics into training data enhancement. Contextual adaptivity enhancement creates training data capable of adapting to different contexts by encoding environmental factors, situational variables, and dynamic adjustment parameters. This fidelity characteristic recognizes that relationships exhibit different patterns in different contexts, and effective AI systems must account for these contextual variations.

The generation of epistemic fidelity characteristics ensure that training data is emotionally resonant, temporally layered, symbolically rich, and contextually adaptive, providing artificial intelligence systems with training data that captures the depth and complexity necessary for advanced learning outcomes. Enhanced training data through epistemic fidelity processing enables AI systems to develop more sophisticated understanding of communication patterns and contextual intelligence.

The combination of all four fidelity characteristics creates training data with optimal epistemic fidelity. Emotional resonance enables AI systems to understand affective dimensions of relationships. Temporal layering (across multiple time scales) enables AI systems to reason about both immediate and long-term relationship dynamics. Symbolic richness (with >twenty semantic features) enables sophisticated pattern recognition and relationship understanding. Contextual adaptivity (through context vectors and adjustment parameters) enables context-aware AI decision-making.

Training data enhanced with these fidelity characteristics substantially improves AI system performance across multiple domains by providing representations that capture the full complexity of human relationships while maintaining privacy through metadata-only processing.

At step 1324, the enhanced training data is delivered to AI systems for learning and inference. The training data delivery process may implement adaptive selection between model-based reinforcement learning using Markov Decision Processes and model-free reinforcement learning using neural networks based on context evaluation, data availability, and computational requirements.

The exponential training data generation method 1300 demonstrates converting linear entity processing into exponential relationship-based training data generation. The process implements privacy-preserving metadata-only processing while generating training data characterized by optimal epistemic fidelity for enhanced artificial intelligence learning effectiveness. The mathematical transformation from n entities to N(N−1)/2 training combinations provides the exponential scaling advantage that addresses training data scarcity while maintaining privacy and quality standards.

Organic Training Data Growth Through Temporal Evolution

Organic training data growth refers to the continuous increase in the quantity and quality of training data generated from existing relationships without requiring external data acquisition or new entity addition. As relationships between entities mature and evolve over time through ongoing interactions, the system observes how communication patterns change, behavioral characteristics develop, and trust deepens. These observations are captured in updated relationship vectors, which are then used to regenerate training combinations with increasing quality.

The same set of entities (e.g., 100 entities creating 4,950 training combinations) generates progressively more valuable training data simply through the passage of time and continued interaction—without ever adding a new entity to the system. As relationships mature over time through ongoing interaction, the multi-dimensional relationship vectors become enriched with temporal, behavioral, and contextual depth. This ongoing temporal evolution provides opportunity for continuous improvement of training data quality without requiring acquisition of new entities.

In an embodiment, the temporal evolution may be used to calculate different parameters including, but not limited to, updated multi-dimensional vectors, quality multiplication factor (QMF), and organic growth rate (OGR).

When a relationship vector is updated through new interaction data, the system calculates the difference (delta) between the previous vector state and the new vector state. This delta represents new training data generated by the evolution of the relationship. For example:

Day 1: Relationship vector V=[temporal_0, behavioral_0, frequency_0, channel_0]

Day 31: Relationship vector V'=[temporal_1, behavioral_1, frequency_1, channel_1]

Delta=V'−V=new training data generated by relationship evolution

Temporal Evolution Contribution (TEC)=Sum (all deltas)/30 days=training combinations per day from evolution As relationships continue to interact, this temporal evolution contribution accumulates, continuously adding new training data. Older relationships produce higher-quality training data than younger relationships. A six-month relationship has more stability and depth than a one-month relationship. A two-year relationship demonstrates relationship resilience and trust development not visible in new relationships.

In an embodiment, training data generator 550 may compute QMF based on relationship age. For example, 1-month relationship: QMF=1.0× (baseline)

6-month relationship: QMF=1.5× (temporal layering demonstrates stability)

12-month relationship: QMF=2.0× (behavioral evolution patterns clear)

24-month relationship: QMF=2.5× (emotional resonance and trust maturity evident)

This multiplier reflects the observed increase in training data quality as relationships mature. The same N(N−1)/2 combinations, when regenerated from older, more mature relationships, contain richer, more nuanced, more stable relationship signals.

In an embodiment, training data generator 550 may compute OGR as below:

OGR=(Sum of TEC across all relationships×Average QMF)/Time Period

Units: Training combinations per unit time

This measures how much new, valuable training data is generated purely from the temporal evolution of existing relationships, with zero requirement for external data acquisition. As relationships interact, the N(N−1)/2 combinations are continuously regenerated with updated, enriched relationship vectors. Each regeneration includes the accumulated temporal evolution, producing training combinations of increasing quality.

This creates a form of compound value growth:

Month 1: 100 entities→N(N−1)/2=4,950 combinations, quality level Q1

Month 6: SAME 100 entities→4,950 combinations, quality level Q1.5 (due to temporal evolution)

Month 12: SAME 100 entities→4,950 combinations, quality level Q2.0

The deployment becomes more valuable over time, not less. Older deployments are more valuable than newer deployments, because the same relationships have had more time to mature and evolve.

In an embodiment, communication management server 506 may continuously monitor organic growth rate against target thresholds. When organic growth rate falls below target (indicating slowing temporal evolution), the system triggers stimulation mechanisms. The stimulation mechanisms may include, but are not limited to, enhancing fidelity parameters, adjusting temporal window, and dimensional reweighing.

Enhancing of fidelity parameters may increase the sensitivity of temporal layering analysis to capture more granular relationship development patterns. Temporal window adjustment includes modifying the time windows over which temporal evolution is measured, potentially capturing patterns that manifest over different time scales. Dimensional reweighting shifts emphasis toward dimensions showing strongest evolution, maximizing the training data richness extracted from ongoing interactions. These mechanisms automatically increase the organic growth rate until it exceeds target thresholds, creating a self-improving, adaptive system that optimizes the value extracted from existing relationships.

These temporal characteristics are captured as fidelity characteristics (temporal layering, behavioral evolution, contextual adaptivity, emotional resonance) that only emerge when the system observes relationships over extended periods.

Figure 14:
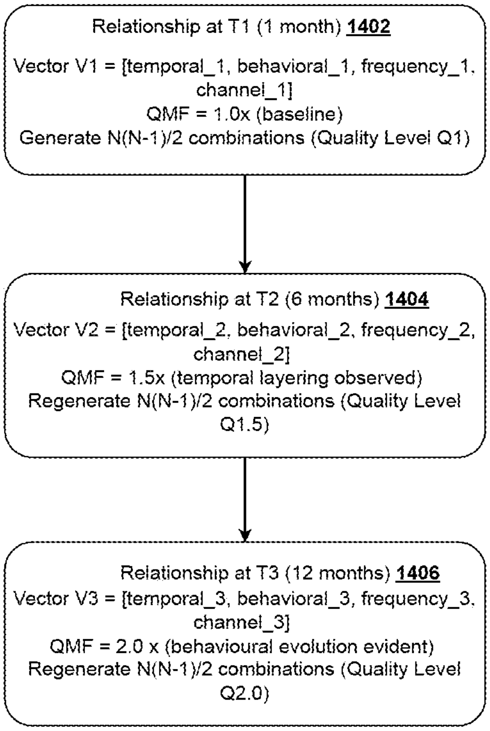
FIG. 14 is an example flow diagram depicting the temporal evolution of relationship between entities, according to an embodiment of the invention.

Method 1300 generates exponentially multiplied training data within a single application domain, producing high-confidence relationship patterns validated through iterative dimensional reduction and pattern validation cycles. These validated patterns, along with their dimensional characteristics (temporal dimensions, behavioral indicators, frequency measures, and channel specifications) constitute the primary source data for cross-domain pattern transfer FIG. 14 is an example flow diagram depicting the temporal evolution of relationship between entities, according to an embodiment of the invention. FIG. 14 demonstrates how a relationship vector evolves across three distinct time points and how the system regenerates training combinations with increasing quality as the relationship matures.

FIG. 14 shows the temporal evolution of a single entity relationship across three time points 1402 (T1 at 1 month), 1404 (T2 at 6 months), and 1406 (T3 at 12 months). At each time point, the diagram illustrates the updated multi-dimensional relationship vector [temporal, behavioral, frequency, channel] capturing the evolved relationship characteristics, corresponding Quality Multiplication Factor (QMF) computed based on relationship age (1.0× at 1 month, 1.5× at 6 months, 2.0× at 12 months) and the regenerated N(N−1)/2 training combinations with quality-enhanced metadata reflecting the relationship's evolution, and the resulting training combination quality level [Q1→Q1.5→Q2.0]

The progression from different time points (1402 to 1404 to 1406) demonstrates that the same entity pair generates increasingly valuable training data as the relationship matures through continued interaction, without requiring any new entity acquisition or external data sources. The vector evolution [V1→V2→V3] captures how temporal layering, behavioral evolution patterns, and contextual adaptivity accumulate over time, producing training data with superior epistemic fidelity.

Figure 15:
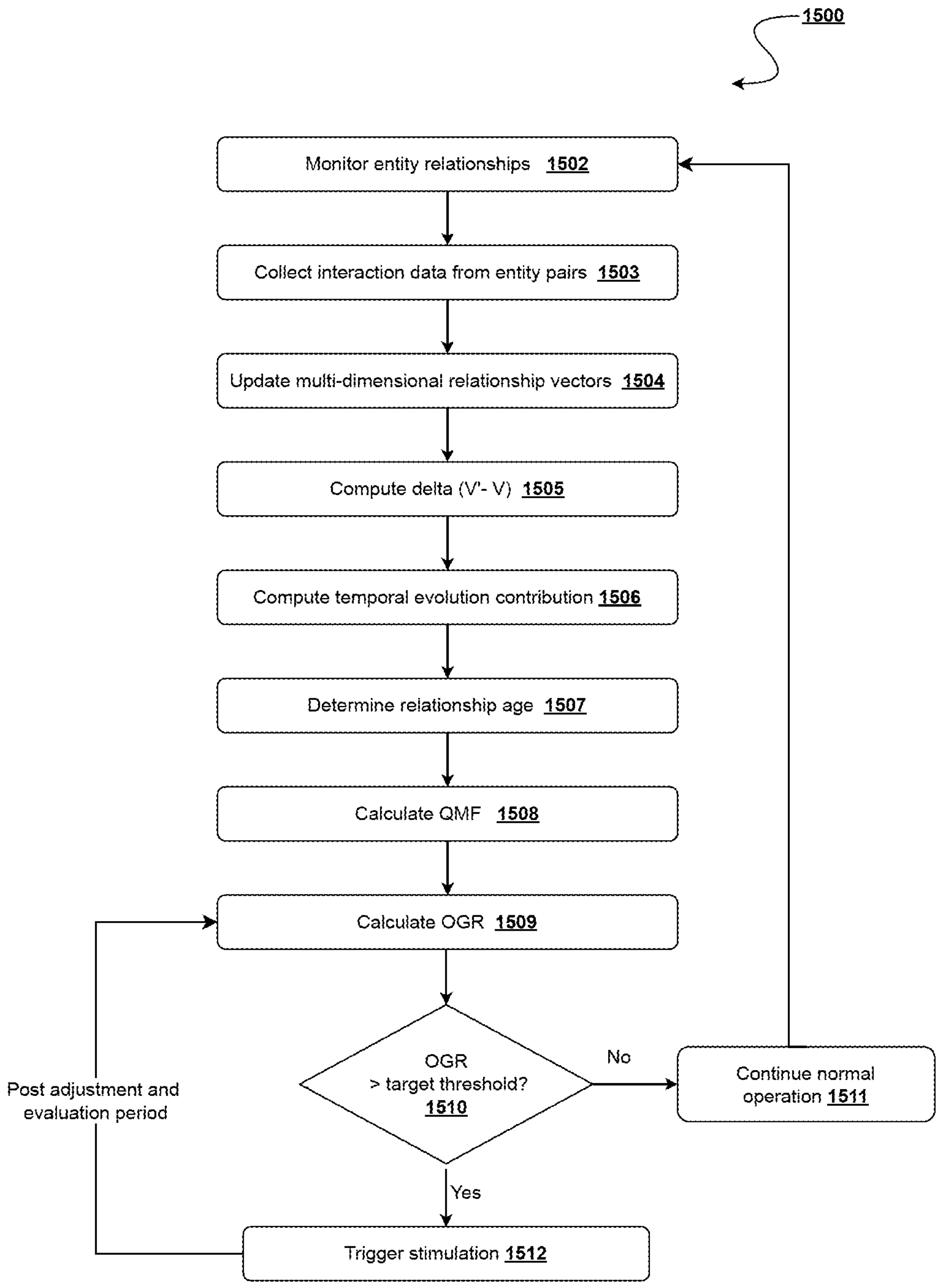
FIG. 15 is an example flow diagram depicting the organic growth rate (OGR) calculation and adaptive monitoring method according to an embodiment of the invention.

FIG. 15 is an example flow diagram 1500 depicting the organic growth rate (OGR) calculation and adaptive monitoring method according to an embodiment of the invention. FIG. 15 illustrates the continuous operational cycle through which communication management server 506 monitors, measures, and optimizes organic training data growth through responsive stimulation mechanisms. The method steps described in the organic training data growth process are performed by processor 511 working in coordination with multiple specialized components within communication management server 506. Rather than executing all operations sequentially in a single monolithic unit, processor 511 orchestrates the workflow by delegating specific computational tasks to specialized components, each optimized for their particular function. This distributed architecture enables efficient parallel processing, scalability to large datasets, and clear separation of concerns where each component maintains responsibility for its specialized domain.

Method begins at step 1502 with monitoring of entity relationships. Processor 511 coordinates with pattern analysis engine 536 to continuously monitor entity interaction metadata flowing through communication management server 506. The system continuously observes interactions between entity pairs across multiple communication domains.

At step 1503, processor 511 may instruct pattern analysis engine 536 to collect interaction data including timestamps, communication channels, response times, interaction duration, and frequency patterns from the interaction graph 520. No communication content is accessed or processed.

At step 1504, processor 511 may signal relationship scoring engine 552 to update multi-dimensional relationship vectors based on the newly collected interaction metadata. The system updates multi-dimensional relationship vectors based on the new interaction data. Each relationship vector is enriched with temporal, behavioral, frequency, and channel dimensions that reflect the evolved state of the relationship.

At step 1505, relationship scoring engine 552 may compute the vector delta (V'−V) representing the difference between previous and current vector states, and transmits the updated vectors and delta values back to processor 511. At step 1505, the system computes delta (Δ) representing the difference between the previous relationship vector state and the updated vector state: Delta=V'−V. This delta represents new training data generated by the relationship's evolution.

At step 1506, processor 511 may receive delta values from relationship scoring engine 552 and coordinates with training data generator 550 to compute Temporal Evolution Contribution (TEC) by summing all deltas across all relationships within the measurement period:

TEC=Sum (all vector deltas) accumulated during the measurement window.

TEC represents the total quantity of relationship evolution contribution generated within the defined measurement window.

Training data generator 550 maintains running TEC calculations and provides periodic summary reports to processor 511.

At step 1507, processor 511 may accesses relationship fingerprints database 534 to determine the age of each entity pair relationship, measuring the duration from initial relationship formation to the current measurement cycle. This age determination is performed by querying the relationship metadata stored in database 534 and computing elapsed time.

At step 1508, processor 511 receives relationship age information and instructs training data generator 550 to calculate the Quality Multiplication Factor (QMF) as a function of relationship age using the non-linear scaling function (1.0× at 1 month, 1.5× at 6 months, 2.0× at 12 months, 2.5× at 24 months). Training data generator 550 applies the QMF formula to each relationship and provides QMF values back to processor 511.

At step 1509, processor 511 coordinates with OGR calculator 562 to compute the Organic Growth Rate (OGR). OGR calculator 562 performs the mathematical computation using TEC values from training data generator 550 and QMF values computed in the previous step, returning the current OGR measurement to processor 511.

In an embodiment, OGR is the quantitative measurement of how much new, valuable training data is being generated from relationship evolution during a specific time period. Rather than counting raw data points, OGR measures the accumulation of temporal evolution contributions (TEC) weighted by relationship quality multipliers (QMF), expressed as training combinations per unit time.

OGR=(ΣTEC×Average QMF)/Measurement_Window_Duration.

Units: Training combinations per unit time (per day, week, or month)

where Measurement_Window_Duration represents the time span over which TEC was accumulated At step 1510, processor 511 compares the calculated OGR against a target threshold.

In an embodiment, the target threshold may be a configurable target threshold that is dynamically adjustable based on system deployment characteristics (size of entity base, domain type, relationship density), historical OGR performance (thresholds increased when system consistently exceeds previous targets), external factors (seasonal variations in entity interaction patterns, domain-specific relationship cycles). Processor 511 may periodically recalculate the target threshold and adjusts the comparison criteria.

At step 1510, if OGR meets or exceeds the target threshold, then at step 1511, processor 511 permits the training data generation pipeline to continue at current parameter settings. Processor 511 instructs training data generator 550 and fidelity enhancer 556 to maintain current operations, continuously regenerating N(N−1)/2 combinations with evolved vectors and quality-enhanced QMF multipliers. Data export interface 558 continues delivering training data to external AI systems. Method 1500 loops back to step 1502 (shown by the feedback arrow) to monitor entity relationships with the new adjusted parameters.

At step 1510, if OGR is below the target threshold, then at step 1512, processor 511 signals adaptive parameter controller 560 to execute stimulation mechanisms. In an embodiment, adaptive parameter controller 560 may signal fidelity enhancer 556 to increase the sensitivity of temporal layering analysis, adjusting sensitivity from 1.0× (baseline) to 5.0× (maximum granularity). This adjustment enables fidelity enhancer 556 to detect more granular relationship development patterns in the next processing cycle.

In an embodiment, adaptive parameter controller 560 may signal training data generator 550 to modify the time windows over which temporal evolution is measured. Temporal windows are adjusted from 15-day windows (micro-patterns) to 365-day windows (macro-patterns), enabling training data generator 550 to capture patterns that manifest over different time scales in subsequent TEC calculations.

In an embodiment, adaptive parameter controller 560 may signal training data generator 550 to shift dimensional emphasis toward dimensions showing strongest evolution. Dimensional weighting is adjusted per dimension, ranging from 0.1× (minimal emphasis) to 2.0× (maximum emphasis), enabling training data generator 550 to emphasize strongly-evolving dimensions and de-emphasize stagnant dimensions in subsequent vector regeneration and combination generation.

After executing these parameter adjustments, adaptive parameter controller 564 logs the adjustment details (timestamp, parameter adjusted, adjustment magnitude, OGR measurement before adjustment) to memory 512 for historical tracking and effectiveness analysis OGR enables the system to detect when organic growth is slowing (falling below a target threshold). When this happens, adaptive stimulation mechanisms automatically adjust system parameters—increasing fidelity sensitivity, modifying temporal windows, or reweighting dimensions—to accelerate relationship evolution and restore OGR to target levels. This creates a self-improving system that maintains optimal training data generation without manual intervention.

Post Adjustment and Evaluation Period

In an embodiment, after stimulation adjustment, processor 511 may permit a configurable evaluation period (recommended: 7 days) to elapse, during which the training data generation pipeline operates with the newly adjusted parameters. The system re-measures OGR after a configurable evaluation period (recommended: 7 days) to determine if the stimulation adjustment succeeded in bringing OGR above target. During this period pattern analysis engine 536 continues collecting interaction data, relationship scoring engine 552 updates vectors with the new dimensional weighting, training data generator 550 regenerates combinations using the modified temporal windows, fidelity enhancer 556 applies the increased sensitivity to temporal layering analysis.

After evaluation period, processor 511 may instruct OGR calculator 562 to remeasure the OGR using the data generated under the new parameter settings. The new OGR measurement is returned to processor 511 for comparison against the target threshold.

If new OGR≥target threshold: Stimulation was successful. Processor 511 logs the effective adjustment to memory 512 and permits normal operation to continue with the new parameter settings. The system has learned which adjustment mechanism was effective for this particular OGR decline pattern.

If new OGR still<target threshold: Stimulation may require escalation. Processor 511 may trigger adaptive parameter controller 560 to execute the next stimulation mechanism (e.g., if fidelity enhancement was applied, temporal window adjustment is now applied), repeating the evaluation cycle.

If new OGR significantly exceeds target, processor 511 may signal adaptive parameter controller 560 to reduce adjustment magnitudes, returning parameters toward baseline while maintaining the improvements that exceeded the target.

The process loops continuously, with processor 511 monitoring OGR, making threshold comparisons, orchestrating component activities, and directing adaptive parameter controller 560 to maintain optimal training data generation indefinitely.

Figure 16:
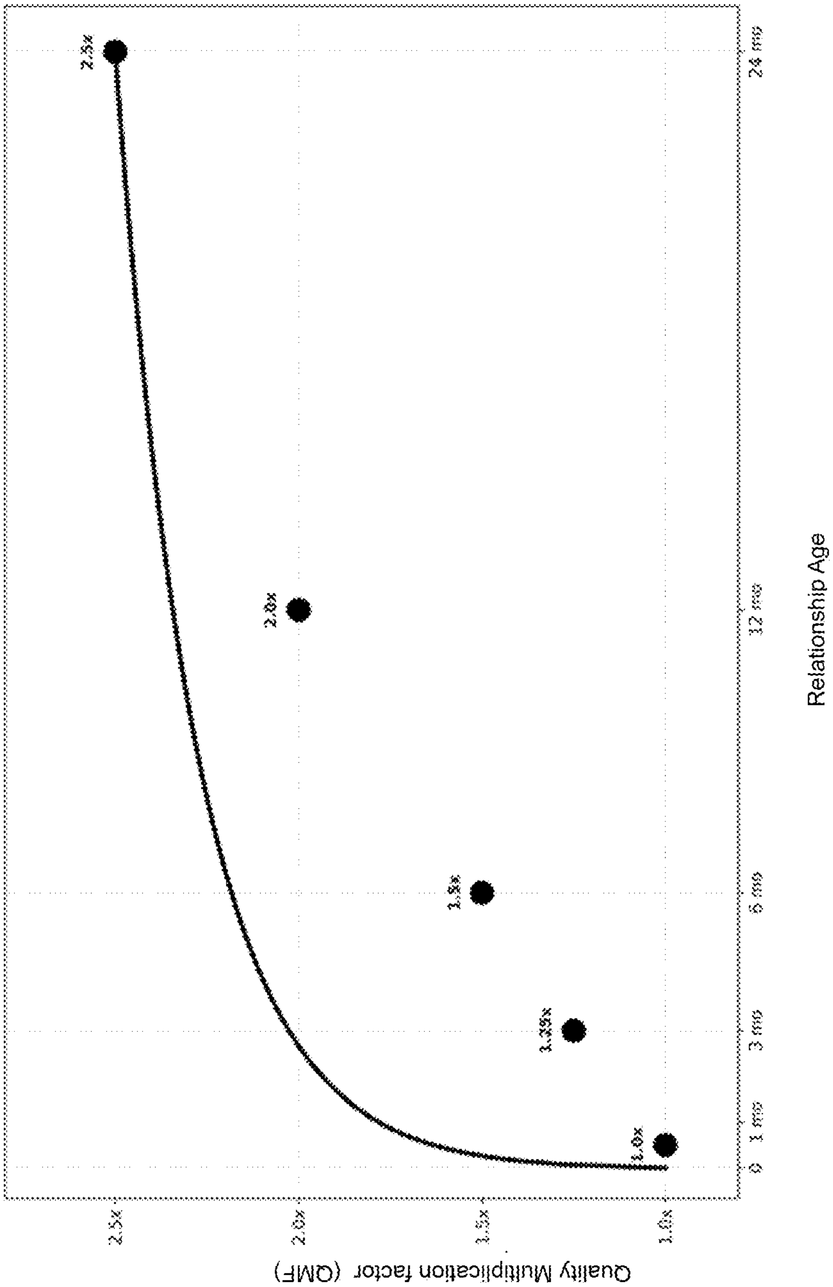
FIG. 16 is an exemplary graph depicting the Quality Multiplication Factor (QMF) as a function of relationship age, according to an embodiment of the invention.

FIG. 16 is an exemplary graph depicting the Quality Multiplication Factor (QMF) as a function of relationship age, according to an embodiment of the invention. The horizontal axis (X-axis) represents relationship age, measured in months from initial relationship formation (0 months to 24 months and beyond). The vertical axis (Y-axis) represents the QMF value, measured in multipliers from 1.0× (baseline) to 2.5× and higher. FIG. 16 illustrates the non-linear scaling relationship between relationship duration and training data quality improvement:

At 1 month (1.0×QMF): Baseline quality level. Newly formed relationships contain limited temporal, behavioral, and contextual information.

At 3 months (approximately 1.25×QMF): Early temporal layering becomes observable. Communication patterns demonstrate initial stability across multiple interaction cycles.

At 6 months (1.5×QMF): Temporal layering demonstrates measurable stability. Behavioral evolution patterns emerge showing how entities adapt and evolve their interaction patterns. The system observes relationship rhythm, communication preferences, and behavioral consistency not visible in younger relationships.

At 12 months (2.0×QMF): Behavioral evolution patterns are clear and statistically significant. Long-term relationship patterns become apparent, including seasonal variations, trust development cycles, and deepened contextual understanding of relationship dynamics.

At 24 months (2.5×QMF): Deep engagement level. Emotional resonance and trust maturity are evident. The system has observed complete relationship cycles, trust development progression, and evolved interaction patterns. Relationships demonstrate resilience through challenges and contextual adaptivity across diverse scenarios.

Beyond 24 months (2.5×+QMF): Relationships continue to generate progressively higher QMF values as additional temporal depth, emotional resonance maturity, and behavioral pattern complexity accumulate.

The non-linear curve demonstrates that training data quality improvements accelerate initially (steep curve from 1-6 months) and then stabilize at higher relationship ages (flatter curve from 12-24+ months). This reflects the reality that early relationship observation captures rapid behavioral establishment and pattern formation, while later observation captures refinement and stability of established patterns. The QMF curve directly supports the system's claim that older relationships produce higher-quality training data than younger relationships, without requiring any external data acquisition or supplementary entity addition.

The skilled person will be aware of a range of possible modifications of the various embodiments described above. Accordingly, the present invention is defined by the claims and their equivalents.

What is claimed is:

1. A system for exponential artificial intelligence (AI) training data generation, the system comprising:

a communication management server comprising one or more processors, a memory, and a plurality of programming instructions stored in the memory, the plurality of programming instructions, when executed by the one or more processors, cause the one or more processors to:

receive entity interaction data from a plurality of entities across multiple communication channels, wherein the entity interaction data is received from the plurality of entities operating in multiple domains;

extract and analyze metadata from the entity interaction data to identify metadata patterns;

calculate a pattern confidence score for each individual pattern among the metadata patterns, wherein the pattern confidence score is calculated based on data completeness, temporal consistency, and behavioral coherence of the individual pattern;

responsive to determining that the pattern confidence score exceeds a quality threshold, identify entity pairs associated with validated patterns, wherein the validated patterns are metadata patterns that exceed the quality threshold;

convert the validated patterns to multi-dimensional relationship vectors for each entity pair, wherein the multi-dimensional relationship vectors are associated with different dimensions of the metadata patterns;

calculate a relationship strength score by applying weights to each dimension in the multi-dimensional relationship vectors, wherein the relationship strength score is indicative of quality and reliability of the entity pairs;

responsive to determining that the relationship strength score exceeds a predetermined threshold for a plurality of entity pairs:

identify a set of qualified entities participating in the entity pairs whose relationship strength score exceeds the predetermined threshold;

determine N as the number of qualified entities in the identified set;

generate N(N−1)/2 unique unordered entity pair combinations from the N qualified entities; and generate training combination data corresponding to the N(N−1)/2 unique unordered entity pair combinations, wherein each training combination comprises a multi-dimensional vector with multiple dimensions, a relationship label, and a domain identifier; and process the training combination data using fidelity characteristics to generate training data.

2. The system of claim 1, wherein to generate N(N−1)/2 training combination data from relationship combination data, the plurality of programming instructions, when executed by the one or more processors, causes the one or more processors to:

create unique entity pairs from the N qualified entities, for each unique entity pair, combine the multi-dimensional relationship vectors with the relationship label and domain identifier to form a training combination; and generate the N(N−1)/2 training combination data.

3. The system of claim 1, wherein the relationship label is a relationship classification between the entity pair, and the domain identifier is a source domain from which the entity interaction data originated.

4. The system of claim 1, wherein to process the N(N−1)/2 training combination data using fidelity characteristics, the plurality of programming instructions, when executed by the one or more processors, causes the one or more processors to:

analyze temporal evolution patterns within relationship combinations to create temporally layered information;

extract emotional resonance indicators from behavioral patterns and trust scores to identify relationship characteristics;

generate symbolic richness through contextual pattern analysis across multiple communication channels; and apply contextual adaptivity by incorporating environmental factors, situational relationship contexts, and domain-specific relationship characteristics.

5. The system of claim 1, wherein the multi-dimensional vectors comprise multiple dimensions, and wherein the multiple dimensions comprise:

temporal dimensions capturing communication timing patterns, response latency patterns, and interaction duration patterns;

behavioral dimensions capturing engagement patterns, initiation patterns, and reciprocity patterns;

communication frequency dimensions capturing interaction frequency and cadence patterns; and channel preference dimensions capturing communication channel usage patterns.

6. The system of claim 1, wherein the plurality of programming instructions, when executed by the one or more processors, causes the one or more processors to:

update the multi-dimensional relationship vectors based on changing entity interaction data over time, wherein the multi-dimensional relationship vectors are updated with temporal, behavioral, frequency, and channel data from each successive interaction; and responsive to identifying updated multi-dimensional relationship vectors, compute a quality multiplication factor (QMF), wherein the QMF is computed as a non-linear function of relationship age between entity pairs and is an indication of accumulated temporal layering, behavioral evolution patterns, and contextual adaptivity characteristics.

7. The system of claim 6, wherein the plurality of programming instructions, when executed by the one or more processors, causes the one or more processors to:

regenerate the N(N−1)/2 training combinations from the updated multi-dimensional relationship vectors;

apply the computed QMF to each combination's quality score, and store or export the regenerated combinations with quality-enhanced metadata.

8. The system of claim 6, wherein the plurality of programming instructions, when executed by the one or more processors, causes the one or more processors to:

calculate an organic growth rate (OGR) by measuring a quantity of new training data generated from the updated multi-dimensional relationship vectors within a time period; and responsive to determining the OGR falls below a target threshold, automatically adjust at least one of a temporal window granularity, a dimension-specific weighting, or a fidelity enhancement sensitivity.

9. The system of claim 6, wherein the plurality of programming instructions, when executed by the one or more processors, causes the one or more processors to:

calculate a temporal evolution contribution (TEC) by computing a sum of vector deltas across each relationship pair over a time period, wherein a delta represents the difference between a previous multi-dimensional relationship vector state and an updated multi-dimensional relationship vector state, wherein the TEC is measured in training combinations per unit time.

10. A method for exponential artificial intelligence (AI) training data generation, the method comprising:

receiving, at a communication management server, entity interaction data from a plurality of entities across multiple communication channels, wherein the entity interaction data is received from the plurality of entities operating in multiple domains;

extracting and analyzing metadata from the entity interaction data to identify metadata patterns;

calculating a pattern confidence score for each individual pattern among the metadata patterns, wherein the pattern confidence score is calculated based on data completeness, temporal consistency, and behavioral coherence of the individual pattern;

responsive to determining that the pattern confidence score exceeds a quality threshold, identifying entity pairs associated with validated patterns, wherein the validated patterns are metadata patterns that exceed the quality threshold;

converting the validated patterns to multi-dimensional relationship vectors for each entity pair, wherein the multi-dimensional relationship vectors are associated with different dimensions of the metadata patterns;

calculating a relationship strength score by applying weights to each dimension in the multi-dimensional relationship vectors, wherein the relationship strength score is indicative of quality and reliability of the entity pairs;

responsive to determining that the relationship strength score exceeds a predetermined threshold for a plurality of entity pairs:

identifying a set of qualified entities participating in the entity pairs whose relationship strength score exceeds the predetermined threshold;

determining N as the number of qualified entities in the identified set;

generating N(N−1)/2 unique unordered entity pair combinations from the N qualified entities; and generating training combination data corresponding to the N(N−1)/2 unique unordered entity pair combinations, wherein each training combination comprises a multi-dimensional vector with multiple dimensions, a relationship label, and a domain identifier; and processing the training combination data using fidelity characteristics to generate training data.

11. The method of claim 10, wherein generating N(N−1)/2 training combination data from relationship combination data, comprises the steps of:

creating unique entity pairs from the N qualified entities, for each unique entity pair, combining the multi-dimensional relationship vector with the relationship label and domain identifier to form a training combination; and generating the N(N−1)/2 training combination data.

12. The method of claim 10, wherein the relationship label is a relationship classification between the entity pair, and the domain identifier is a source domain from which the entity interaction data originated.

13. The method of claim 10, wherein processing the N(N−1)/2 training combination data using fidelity characteristics, comprises the steps of:

analyzing temporal evolution patterns within relationship combinations to create temporally layered information;

extracting emotional resonance indicators from behavioral patterns and trust scores to identify relationship characteristics;

generating symbolic richness through contextual pattern analysis across multiple communication channels; and applying contextual adaptivity by incorporating environmental factors, situational relationship contexts, and domain-specific relationship characteristics.

14. The method of claim 10, wherein the multi-dimensional vector comprises multiple dimensions, and wherein the multiple dimensions comprise:

temporal dimensions capturing communication timing patterns, response latency patterns, and interaction duration patterns;

behavioral dimensions capturing engagement patterns, initiation patterns, and reciprocity patterns;

communication frequency dimensions capturing interaction frequency and cadence patterns; and channel preference dimensions capturing communication channel usage patterns.

15. The method of claim 10, wherein the method further comprises:

updating the multi-dimensional relationship vectors based on changing entity interaction data over time, wherein the multi-dimensional relationship vectors are updated with temporal, behavioral, frequency, and channel data from each successive interaction; and responsive to identifying updated multi-dimensional relationship vectors, computing a quality multiplication factor (QMF), wherein the QMF is computed as a non-linear function of relationship age between entity pairs and is an indication of accumulated temporal layering, behavioral evolution patterns, and contextual adaptivity characteristics.

16. The method of claim 15, wherein the method further comprises:

regenerating the N(N−1)/2 training combinations from the updated multi-dimensional relationship vectors;

applying the computed QMF to each combination's quality score, and storing or exporting the regenerated combinations with quality-enhanced metadata.

17. The method of claim 15, wherein the method further comprises:

calculating an organic growth rate (OGR) by measuring a quantity of new training data generated from the updated multi-dimensional relationship vectors within a time period; and responsive to determining the OGR falls below a target threshold, automatically adjust at least one of a temporal window granularity, a dimension-specific weighting, or a fidelity enhancement sensitivity.

18. The method of claim 15, wherein the method further comprises:

calculating a temporal evolution contribution (TEC) by computing a sum of vector deltas across each relationship pair over a time period, wherein a delta represents the difference between a previous multi-dimensional relationship vector state and an updated multi-dimensional relationship vector state, wherein the TEC is measured in training combinations per unit time.

* * * * *